US010508897B2

(12) United States Patent
Hernandez-Oliver et al.

(10) Patent No.: US 10,508,897 B2
(45) Date of Patent: Dec. 17, 2019

(54) MAGNET DEVICE AND POSITION SENSING SYSTEM

(71) Applicants: Tyco Electronics Corporation, Berwyn, PA (US); Tyco Electronics (Shanghai) Co., Ltd., Shanghai (CN)

(72) Inventors: Salvador Hernandez-Oliver, Berwyn, PA (US); Qixin Xue, Shanghai (CN); Yao Zhou, Shanghai (CN)

(73) Assignees: TE ConnectivityCorporation, Berwyn, PA (US); Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/394,889

(22) PCT Filed: Apr. 15, 2013

(86) PCT No.: PCT/CN2013/000432
§ 371 (c)(1),
(2) Date: Oct. 16, 2014

(87) PCT Pub. No.: WO2013/155871
PCT Pub. Date: Oct. 24, 2013

(65) Prior Publication Data
US 2015/0123652 A1 May 7, 2015

(30) Foreign Application Priority Data

Apr. 16, 2012 (CN) .................... 2012 2 0176172 U
Jun. 29, 2012 (CN) ........................ 2012 1 0223249

(51) Int. Cl.
*G01B 7/30* (2006.01)
*G01D 5/14* (2006.01)
(Continued)

(52) U.S. Cl.
CPC ............... *G01B 7/30* (2013.01); *G01D 5/145* (2013.01); *H01F 7/0205* (2013.01); *G01B 7/003* (2013.01); *G01D 5/147* (2013.01)

(58) Field of Classification Search
CPC ...... G01B 11/2522; G01B 7/30; G01B 7/003; G01D 5/145; G01D 5/147; G01D 5/2033; G01D 5/2241
(Continued)

(56) References Cited

U.S. PATENT DOCUMENTS 4,791,365 A * 12/1988 Johannes .............. F02P 7/0675
123/617
4,810,965 A * 3/1989 Fujiwara .................. G01D 5/20
324/207.21
(Continued)

FOREIGN PATENT DOCUMENTS

| CN | 202836504 U | 3/2013 |
|---|---|---|
| EP | 1441204 A2 | 7/2004 |

(Continued)

OTHER PUBLICATIONS

PCT Notification, International Preliminary Report on Patentability and Written Opinion of the International Searching Authority, International Application No. PCT/CN2013/000432, dated Oct. 30, 2014, 15 pages.

(Continued)

*Primary Examiner* — Patrick Assouad
*Assistant Examiner* — Sean Curtis
(74) *Attorney, Agent, or Firm* — Barley Snyder

(57) ABSTRACT

The present disclosure provides a magnet device for providing the magnetic density changes/magnetic field changes in relation to a detecting position. The magnet device comprises a magnet member adapted to be mounted on a rotatable shaft and be rotated for producing the magnetic (Continued)

density changes/magnetic field changes in relation to the detecting position when the magnet member is rotating around the rotatable shaft. To concentrate/condense the density of the magnetic density changes/magnetic field changes, the magnet device includes a magnetic flux density concentrator.

18 Claims, 13 Drawing Sheets

(51) Int. Cl.
*G01B 7/00* (2006.01)
*H01F 7/02* (2006.01)

(58) Field of Classification Search
USPC .................. 324/207.11, 207.13, 207.2, 324/207.21–207.24, 167
See application file for complete search history.

(56) References Cited

U.S. PATENT DOCUMENTS

| | | | | |
|---|---|---|---|---|
| 4,875,008 A * | 10/1989 | Lorenzen | ............... | G01B 7/14 324/207.21 |
| 4,901,704 A * | 2/1990 | Safranek | ............... | F02P 1/086 123/149 D |
| 4,992,733 A * | 2/1991 | Griebeler | ............ | F15B 15/2846 324/207.21 |
| 5,041,784 A * | 8/1991 | Griebeler | ............... | F15B 15/28 324/207.21 |
| 5,164,668 A * | 11/1992 | Alfors | ................. | G01B 7/30 324/207.12 |
| 5,270,645 A * | 12/1993 | Wheeler | ............... | G01D 5/147 123/376 |
| 5,315,244 A * | 5/1994 | Griebeler | ............ | F15B 15/2846 324/207.13 |
| 5,332,965 A * | 7/1994 | Wolf | ............... | G01D 3/02 324/202 |
| 5,471,736 A * | 12/1995 | Griebeler | ............ | F15B 15/2846 29/602.1 |
| 5,497,081 A * | 3/1996 | Wolf | ............... | G01D 3/02 324/207.12 |
| 5,568,048 A * | 10/1996 | Schroeder | ............. | G01D 5/145 324/207.12 |
| 5,602,472 A * | 2/1997 | Bergstedt | ............... | G01P 3/487 188/181 R |
| 5,742,160 A * | 4/1998 | Bergstedt | ............... | G01P 3/487 324/162 |
| 5,811,968 A * | 9/1998 | Nakazawa | ............. | G01D 5/145 123/617 |
| 5,818,223 A * | 10/1998 | Wolf | ................. | F02D 11/106 324/207.12 |
| 6,064,199 A * | 5/2000 | Walter | ................. | G01B 7/003 123/406.58 |
| 6,118,284 A * | 9/2000 | Ghoshal | ................. | G01R 33/02 324/754.29 |
| 6,191,579 B1 * | 2/2001 | Striker | ................. | G01D 3/08 324/207.21 |
| 6,198,275 B1 * | 3/2001 | Wolf | ................. | F02D 11/106 324/207.12 |
| 6,310,473 B1 * | 10/2001 | Zhao | ................. | G01D 5/145 324/207.2 |
| 6,326,780 B1 * | 12/2001 | Striker | ................. | G01D 5/145 324/207.2 |
| 6,373,241 B1 * | 4/2002 | Weber | ................. | G01D 5/145 310/68 B |
| 6,429,647 B1 * | 8/2002 | Nicholson | ............... | G01D 5/145 324/207.2 |
| 6,439,066 B1 * | 8/2002 | Norton | ................. | G01L 3/102 73/862.333 |
| 6,448,763 B1 * | 9/2002 | Spellman | ........... | G01D 5/24476 324/207.21 |
| 6,518,749 B1 * | 2/2003 | Oudet | ................. | G01D 5/145 324/207.2 |
| 6,576,890 B2 * | 6/2003 | Lin | ................. | G01D 5/145 250/231.14 |
| 6,586,929 B1 * | 7/2003 | Luetzow | ................ | G01D 5/145 324/207.2 |
| 6,693,421 B2 * | 2/2004 | Wolf | ................. | G01P 3/487 324/207.2 |
| 6,703,827 B1 * | 3/2004 | Wolf | ................. | G01D 3/022 324/207.12 |
| 6,753,680 B2 * | 6/2004 | Wolf | ................. | G01B 7/003 324/207.2 |
| 6,822,441 B1 * | 11/2004 | Moreno | ................. | G01D 5/145 324/207.25 |
| 6,836,111 B2 * | 12/2004 | Moreno | ................. | G01D 5/145 324/207.25 |
| 6,911,817 B2 * | 6/2005 | Clark | ................. | B60T 8/171 324/173 |
| 6,935,193 B2 * | 8/2005 | Heisenberg | ............... | B62D 6/10 73/862.324 |
| 6,940,275 B2 * | 9/2005 | Sogge | ................. | G01D 5/145 324/207.2 |
| 7,023,201 B2 * | 4/2006 | Sogge | ................. | G01D 5/145 324/205 |
| 7,028,545 B2 * | 4/2006 | Gandel | ................. | G01L 3/104 73/328 |
| 7,049,808 B2 * | 5/2006 | Martinez | ................ | G01D 5/145 324/207.25 |
| 7,129,700 B2 * | 10/2006 | Okubo | ................. | G01D 5/145 324/207.25 |
| 7,151,369 B1 * | 12/2006 | Wolf | ................. | G01D 5/145 324/207.24 |
| 7,188,021 B2 * | 3/2007 | Spicer | ................. | F02D 41/009 701/103 |
| 7,208,939 B2 * | 4/2007 | Frederick | ............... | G01D 5/145 324/207.2 |
| 7,219,562 B2 * | 5/2007 | Keane | ................. | G01D 5/145 324/207.2 |
| 7,230,419 B2 * | 6/2007 | Godoy | ................. | G01D 11/245 324/207.2 |
| 7,231,837 B2 * | 6/2007 | McCoy, Jr. | ............ | B25J 13/088 324/207.2 |
| 7,253,613 B2 * | 8/2007 | Tokuhara | ............... | G01D 3/022 324/207.25 |
| 7,288,930 B2 * | 10/2007 | Clark | ................. | B60T 8/171 324/174 |
| 7,298,395 B2 * | 11/2007 | Fukaya | ................. | G01D 5/145 348/149 |
| 7,307,415 B2 * | 12/2007 | Seger | ................. | G01D 5/04 324/207.2 |
| 7,391,208 B2 * | 6/2008 | Wolf | ................. | G01D 5/147 324/207.2 |
| 7,397,210 B2 * | 7/2008 | Arai | ................. | H02P 21/06 318/434 |
| 7,417,421 B2 * | 8/2008 | Wendt | ................. | G01D 5/145 324/207.21 |
| 7,463,023 B1 * | 12/2008 | Moreno | ................. | G01D 5/145 324/207.2 |
| 7,469,604 B2 * | 12/2008 | Hedayat | ................ | G01L 3/102 148/100 |
| 7,570,047 B2 * | 8/2009 | Stuve | ................. | G01R 33/07 324/207.2 |
| 7,791,334 B2 * | 9/2010 | Fischer | ................. | G01D 5/145 324/207.2 |
| 7,800,389 B2 * | 9/2010 | Friedrich | .......... | G01R 31/3187 324/750.3 |
| 7,895,906 B2 * | 3/2011 | Hedayat | ................ | G01L 3/104 73/862.333 |
| 8,001,850 B2 * | 8/2011 | Hedayat | ................ | G01L 3/104 73/862.331 |
| 8,087,305 B2 * | 1/2012 | Eggimann | ............... | G01L 3/104 73/862.333 |
| 8,115,479 B2 * | 2/2012 | Aimuta | ................. | G01D 5/2451 324/207.25 |
| 8,519,700 B2 * | 8/2013 | Jerance | ................. | G01D 5/145 324/207.12 |

(56) References Cited

U.S. PATENT DOCUMENTS

| | | | | |
|---|---|---|---|---|
| 8,692,639 B2* | 4/2014 | Baarman | ............... | H01F 1/26 336/110 |
| 8,763,637 B2* | 7/2014 | Soldo | ............... | F16K 37/0033 116/277 |
| 8,773,124 B2* | 7/2014 | Ausserlechner | ....... | G01D 5/145 324/173 |
| 8,896,297 B2* | 11/2014 | Itomi | ............... | G01D 5/145 324/207.12 |
| 9,018,944 B2* | 4/2015 | Mol | ............... | G01D 5/145 324/207.2 |
| 9,070,873 B2* | 6/2015 | Herbst | ............... | G01L 5/221 |
| 9,114,833 B2* | 8/2015 | Becker | ............... | B62D 6/10 |
| 9,207,100 B2* | 12/2015 | Frachon | ............... | G01D 5/145 |
| 9,316,482 B2* | 4/2016 | Delbaere | ............... | G01B 7/30 |
| 9,523,589 B2* | 12/2016 | Nakamura | ............... | G01R 33/07 |
| 9,625,278 B2* | 4/2017 | Nakamura | ............... | G01R 33/07 |
| 9,841,296 B2* | 12/2017 | Kane | ............... | G01D 5/145 |
| 2002/0039025 A1* | 4/2002 | Shiba | ............... | G01D 5/145 324/318 |
| 2002/0121894 A1* | 9/2002 | Ooki | ............... | G01D 5/145 324/207.2 |
| 2002/0190709 A1* | 12/2002 | Frederick | ............... | G01D 5/145 324/207.2 |
| 2003/0137293 A1* | 7/2003 | Welsch | ............... | G01D 5/145 324/207.2 |
| 2003/0145663 A1* | 8/2003 | Heisenberg | ............... | B62D 6/10 73/862.324 |
| 2003/0218458 A1* | 11/2003 | Seger | ............... | G01D 5/04 324/303 |
| 2004/0050180 A1* | 3/2004 | Abe | ............... | G01D 5/2053 73/862.331 |
| 2004/0160220 A1* | 8/2004 | Wendt | ............... | G01D 5/145 324/207.21 |
| 2004/0164733 A1* | 8/2004 | Fukaya | ............... | G01D 5/145 324/207.25 |
| 2005/0039564 A1* | 2/2005 | Ouyang | ............... | G01D 5/145 74/514 |
| 2005/0068024 A1* | 3/2005 | Byram | ............... | G01D 5/145 324/207.25 |
| 2005/0127900 A1* | 6/2005 | Johnson | ............... | G01D 5/145 324/207.2 |
| 2005/0194967 A1* | 9/2005 | Godoy | ............... | G01D 5/145 324/207.2 |
| 2006/0089784 A1* | 4/2006 | Spicer | ............... | F02D 41/009 701/115 |
| 2006/0097717 A1* | 5/2006 | Tokuhara | ............... | G01D 3/022 324/207.25 |
| 2006/0244441 A1* | 11/2006 | Ramsden | ............... | G01D 5/145 324/207.22 |
| 2007/0132414 A1* | 6/2007 | Arai | ............... | B62D 5/049 318/432 |
| 2007/0229058 A1* | 10/2007 | Wolf | ............... | G01D 5/145 324/207.24 |
| 2008/0252285 A1* | 10/2008 | Passwater | ............... | G01D 5/145 324/207.25 |
| 2008/0294344 A1* | 11/2008 | Sugiura | ............... | E21B 47/024 702/6 |
| 2008/0309260 A1* | 12/2008 | Kanai | ............... | H02K 41/03 318/38 |
| 2009/0091312 A1* | 4/2009 | Ito | ............... | G01D 5/147 324/207.2 |
| 2009/0206827 A1* | 8/2009 | Aimuta | ............... | G01D 5/145 324/207.25 |
| 2010/0001721 A1* | 1/2010 | Inotsuka | ............... | G01D 5/145 324/207.25 |
| 2010/0176804 A1* | 7/2010 | Ausserlechner | ....... | G01D 3/028 324/207.25 |
| 2010/0211347 A1* | 8/2010 | Friedrich | ............... | G01R 33/0023 702/117 |
| 2010/0289485 A1* | 11/2010 | Eggimann | ............... | G01D 5/145 324/207.25 |
| 2011/0115479 A1* | 5/2011 | Blakesley | ............... | G01D 5/145 324/207.25 |
| 2011/0254543 A1* | 10/2011 | Frachon | ............... | G01D 5/145 324/207.25 |
| 2011/0290332 A1* | 12/2011 | Soldo | ............... | F16K 37/0033 137/15.01 |
| 2011/0301913 A1* | 12/2011 | Matsumoto | ............... | G01D 5/145 702/151 |
| 2012/0105057 A1* | 5/2012 | Mol | ............... | G01D 5/145 324/251 |
| 2012/0146630 A1* | 6/2012 | Itomi | ............... | G01D 5/145 324/207.25 |
| 2013/0063134 A1* | 3/2013 | Kane | ............... | G01D 5/145 324/207.2 |
| 2013/0169270 A1* | 7/2013 | Delbaere | ............... | G01D 5/24409 324/207.25 |
| 2013/0186209 A1* | 7/2013 | Herbst | ............... | G01L 5/221 73/862.333 |
| 2015/0123652 A1* | 5/2015 | Hernandez-Oliver | ............... | G01D 5/145 324/207.13 |

FOREIGN PATENT DOCUMENTS

| | | |
|---|---|---|
| JP | 20034412 A | 1/2003 |
| JP | 2003139560 A | 5/2003 |
| JP | 2004264222 A | 9/2004 |
| JP | 2007-040722 | 2/2007 |
| JP | 2009-288158 | 12/2009 |
| KR | 10-0761225 | 9/2007 |

OTHER PUBLICATIONS

International Search Report, International Application PCT/CN2013/000432, dated Jul. 25, 2013, 2 pages.

Chinese First Office Action and Search Report, Chinese Patent Application No. 201210223249.X, dated May 6, 2015, 9 pages.

Abstract of CN 202836504, dated Mar. 27, 2013, 1 page.

Extended European Search Report, European Patent Application No. 13778969.9, dated Feb. 2, 2016, 7 pages.

European Office Action, European Patent Application No. 13778969.9, dated Mar. 1, 2018, 4 pages.

Korean Office Action, Korean Patent Application No. 20-2014-7000057, dated Jun. 27, 2016, 10 pages.

Abstract of JP 2009-288158, dated Dec. 10, 2009, 1 page.

Abstract of JP 2007-040722, dated Feb. 15, 2007, 1 page.

* cited by examiner

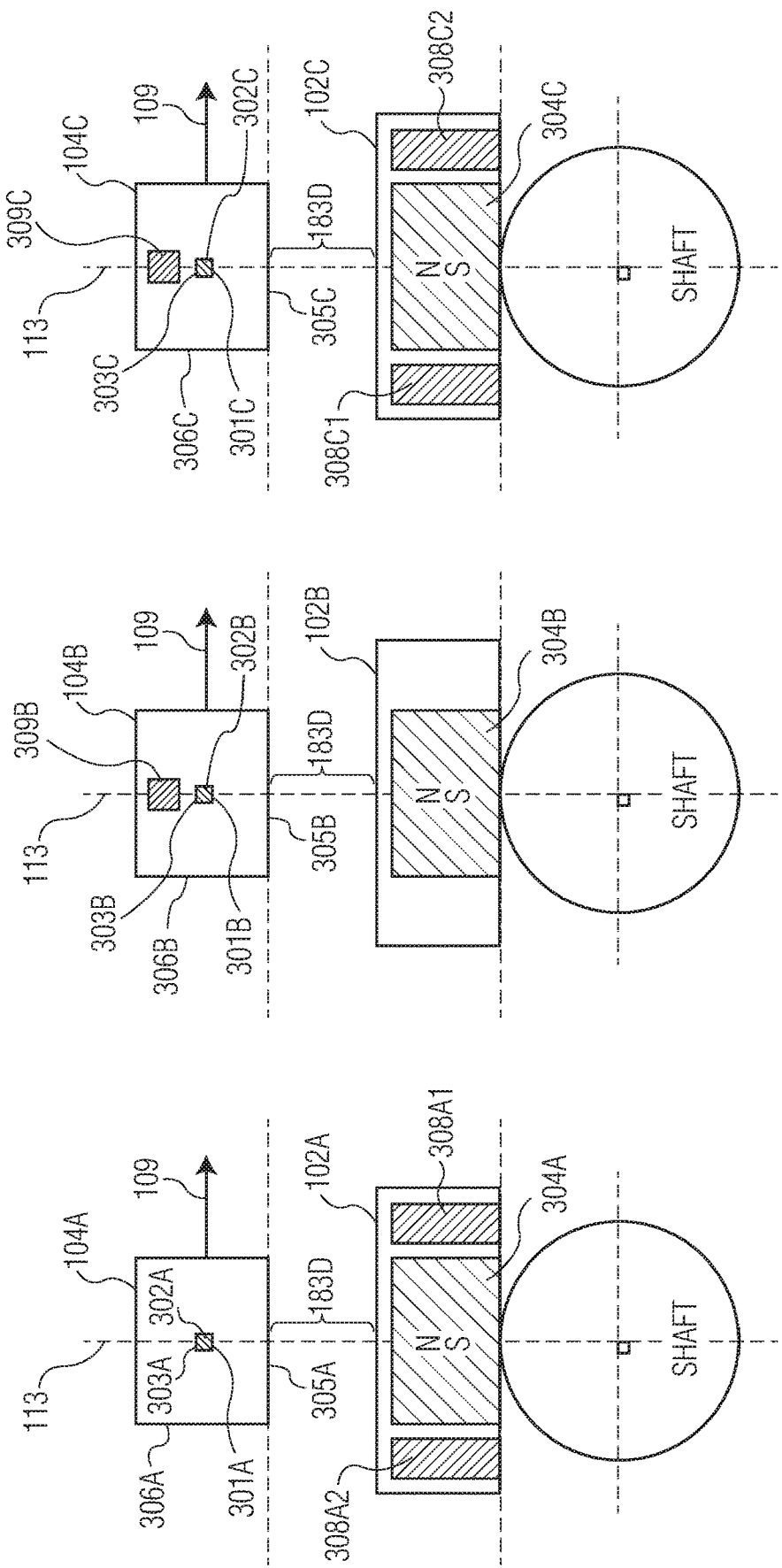

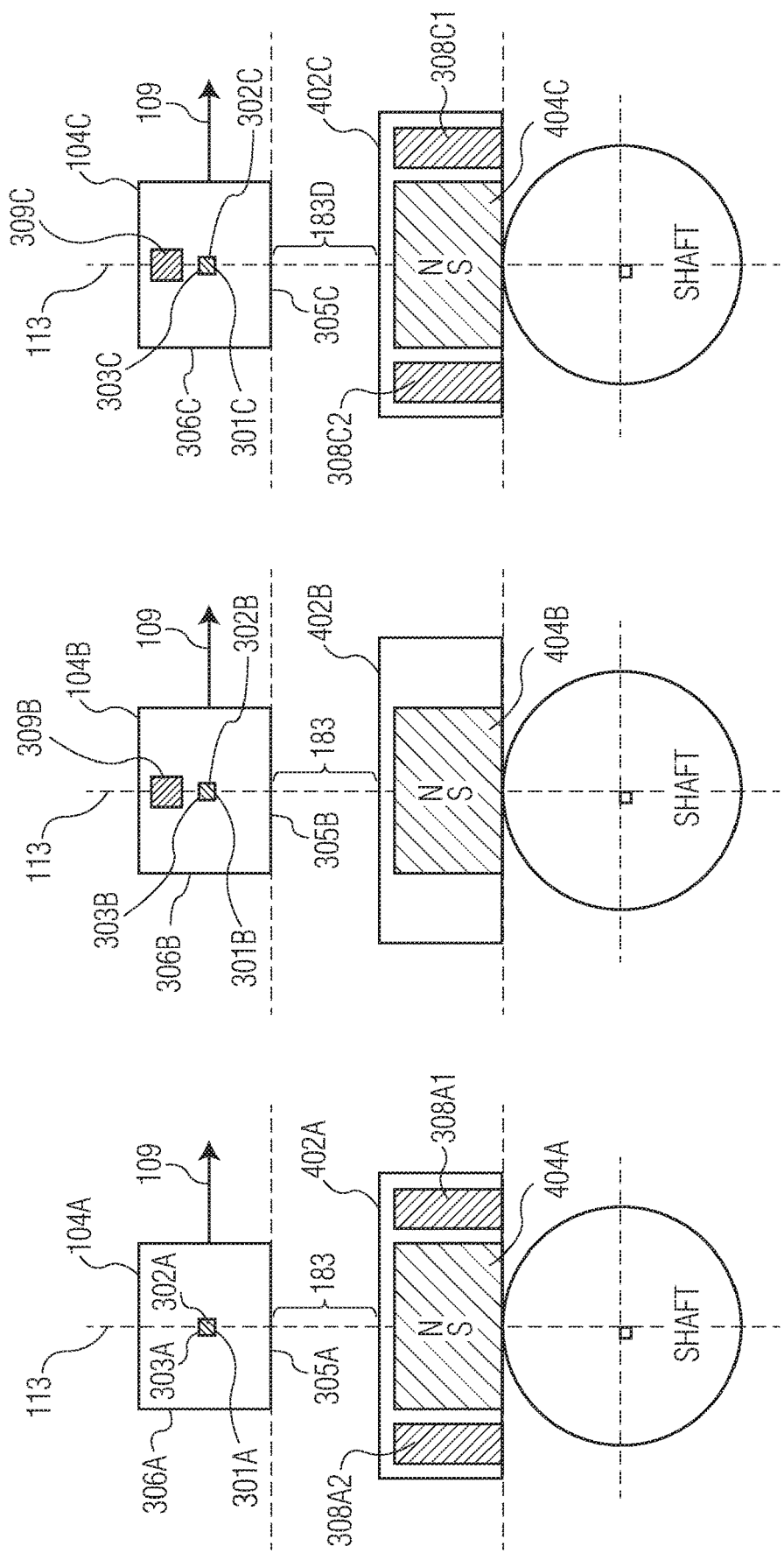

MAGNET DEVICE AND POSITION SENSING SYSTEM

CROSS-REFERENCE TO RELATED APPLICATIONS

This application is a continuation of PCT International Application No. PCT/CN2013/000432 filed Apr. 15, 2013, which claims priority under 35 U.S.C. § 119 to Chinese Patent Application 201220176172.0 filed on Apr. 16, 2012 and Chinese Patent Application 201210223249.X filed on Jun. 29, 2012.

FIELD OF THE INVENTION

The present disclosure relates generally to a magnet device and a position sensing device, and in particular, to a magnet device that is used in a position sensing device for detecting an angular position range of a rotatable shaft.

BACKGROUND

It is known in the industry to use position sensing devices to detect angular positions of a rotatable shaft.

Traditionally, mechanical-contacted position sensing devices are used to detect angular positions of a rotatable shaft. However, mechanical-contacted position sensing devices have some shortcomings including mechanical wear, low angle accuracy and reliability and no diagnostic capability.

There has been a proposal to use an electronic sensing system to generate binary signals to reflect angular positions of a rotatable shaft. Specifically, the electronic sensing system includes a sensing device for generating analog electrical signals in response to the rotation of the rotatable shaft and the electronic sensing system further processes the analog signals to generate the binary signals to indicate the angular position of the rotatable shaft. More specifically, a magnet device is attached on the rotatable shaft and adapted to rotate together with the rotatable shaft. The magnet device causes magnetic flux density changes/magnetic field changes to the sensing device while it is rotating around the rotatable shaft. The sensing device generates analog electrical signals in response to the magnetic flux density changes/magnetic field changes and the analog electric signals are then converted into binary signals.

Therefore, there is a need to provide an improved magnet device for generating magnetic flux density changes/magnetic field changes that more accurately reflect the angular position of a rotatable shaft.

There is another need to provide an improved sensing device to generate binary state signals to more accurately reflect the angular position of a rotatable shaft using the magnetic flux density changes/magnetic field changes.

SUMMARY

In a first aspect, the present disclosure provides a magnet device for providing the magnetic density changes/magnetic field changes in relation to a detecting position, which comprises:

a magnet member adapted to be mounted on a rotatable shaft and be rotated therewith, the magnet member producing the magnetic density changes/magnetic field changes in relation to the detecting position when the magnet member is rotating around the rotatable shaft; and a magnetic flux density concentrator to concentrate/condense the density of the magnetic density changes/magnetic field changes.

According to the first aspect, the magnet device is use with a sensing device, which has the detecting position where a sensing element is located, wherein:

the sensing device includes the sensing element having a front side and a back side;

the magnetic flux density concentrator includes a magnetic flux density concentrator element positioned adjacent to the back side of the sensing element.

According to the first aspect of the magnet device, wherein:

the magnet member has a first lateral side and a second lateral side that are located in the opposite sides of the magnet member;

the magnetic flux density concentrator further includes a first and a second magnetic flux density concentrator elements;

the first magnetic flux density concentrator element is positioned adjacent to the first lateral side of the magnet member; and the second magnetic flux density concentrator element is positioned adjacent to the second lateral side of the magnet member.

According to a second aspect, the present disclosure provides a position sensing system for generating binary state signals to indicate the angular position range for a rotatable shaft, which comprises:

a magnet device described in the first aspect, which generates the magnetic density changes/magnet field changes;

a sensing device for generating electronic signals in response to the magnetic density changes/magnetic field changes; and a processing circuit for generating the binary state signals in response to the electronic signals.

According to the second aspect of the position sensing system, wherein:

the processing circuit comprises a threshold circuit for providing a threshold voltage on a bell-shaped function curve; and an indicating circuit;

wherein the indicating circuit generates a first signal state when the voltage of the sensed electrical signals is above (or below) the threshold voltage and generates a second signal state when the voltage of the sensed electrical signal is below (or above) the threshold voltage.

According to the second aspect of the position sensing system, wherein:

the threshold voltage and the bell-shaped function curve are calibrated prior to installation of the position sensing system in response to the magnetic flux density changes/magnetic field changes in one dimension when the bipolar magnet rotates around the rotatable shaft for 360 degrees.

According to the second aspect, the position sensing system further comprises:

an adjusting circuit for adjusting width of the binary state signal to compensate variations of operating condition including variations in air gaps and temperature and parameter variations in components used, by monitoring and updating the min and max peaks of the electronic signals that comply with the bell-shaped function curve.

By providing the magnet device and the position sensing system, the present disclosure overcomes the above mentioned shortcomings in the existing art.

BRIEF DESCRIPTION OF THE DRAWINGS

The present invention will be described with reference to the accompanying drawings, wherein:

FIGS. 3A-C depict three embodiments of the magnet device 102 and sensing device 104 shown in FIGS. 1A-C according to the present invention;

FIGS. 4A-C depict three additional embodiments of the magnet devices 102A-C and sensing device 104A-C shown in FIGS. 1A-C according to the present invention;

DETAILED DESCRIPTION OF THE EMBODIMENT(S)

Reference is now made to the embodiments, examples of which are illustrated in the accompanying drawings. In the detailed description of the embodiments, directional terminology, such as "top," "bottom," "above," "below," "left," "right," etc., is used with reference to the orientation of the Figure(s) being described. Because components of embodiments of the present disclosure can be positioned in a number of different orientations, the directional terminology is used for purposes of illustration and is in no way limiting. Whenever possible, the same or similar reference numbers and symbols are used throughout the drawings to refer to the same or similar parts.

Figure 1A:
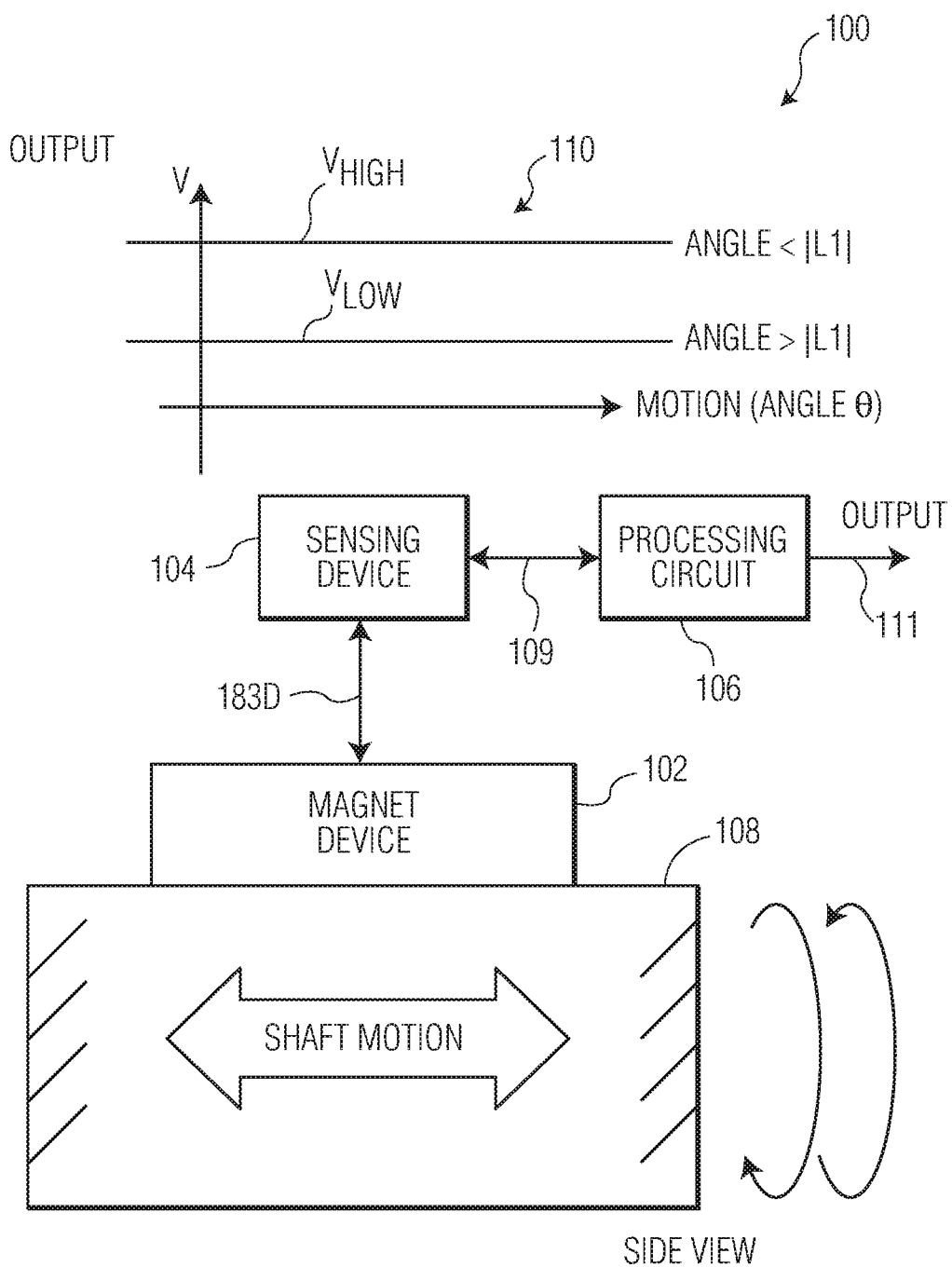
FIG. 1A depicts a position sensing system 100 according to the present disclosure, which shows a side view of the rotatable shaft 108 in the position sensing system 100.

FIG. 1A depicts a position sensing system 100 according to the present disclosure, which shows the side view of the rotatable shaft 108 in the position sensing system 100.

In FIG. 1A, the position sensing system 100 includes a magnet device 102, a sensing device 104, a processing circuit 106 and a rotatable shaft 108. The sensing device 104 is electrically connected to the processing circuit 106 through a link 109, and the magnet device 102 is mounted on the rotatable shaft 108 and adapted to rotate together with the rotatable shaft 108 around the axis 112 (as shown in FIG. 1C) of the rotatable shaft 108. The sensing device 104 is positioned above and separated from the magnet device 102 with a distance D (or air gap) 183. When rotating around the axis 112 of the rotatable shaft 108, the magnet device 102 can cause magnetic flux density changes, which in turn causes magnetic field changes, to a position (or a detecting position) where the sensing device 104 is located. The sensing device 104 can generate electrical signals (such as PWM, SENT, etc) when subjected to the magnetic flux density changes/magnetic field changes from the magnet device 102. As an illustrative embodiment, the sensing device 104 may include a Hall-effect circuitry for generating electrical signals in response to the magnetic field changes caused by the magnetic flux density changes. The sensing device 104 applies the sensed electrical signals to the processing circuit 106, which in turn generates a binary state signal 110 at its output terminal (i.e. link 111) in response to the sensed electrical signals.

As shown in FIG. 1A, the rotatable shaft 108 can move linearly along its longitude direction and rotate around its axis 112 (as shown in FIG. 1C). When the rotatable shaft 108 linearly moves along its longitude direction, the processing circuit 106 maintains its binary voltage state signal at its output 111. In other words, the binary state output 111 of the processing circuit 106 does not change its binary state output in response to the linear motion of the rotatable shaft 108 because the sensing device 104 cannot detect any magnetic flux density changes and/or magnetic field changes from the liner movement of the rotatable shaft. However, when the rotatable shaft 108 rotates around its axis 112, the processing circuit 106 may change its binary voltage state between Vhigh and Vlow at its output 111, depending on the rotation angle of the rotatable shaft 108. In other words, the processing circuit 106 switches its binary state output 111 between Vhigh and Vlow in response to the rotation angle of the rotatable shaft 108.

Figure 1B:
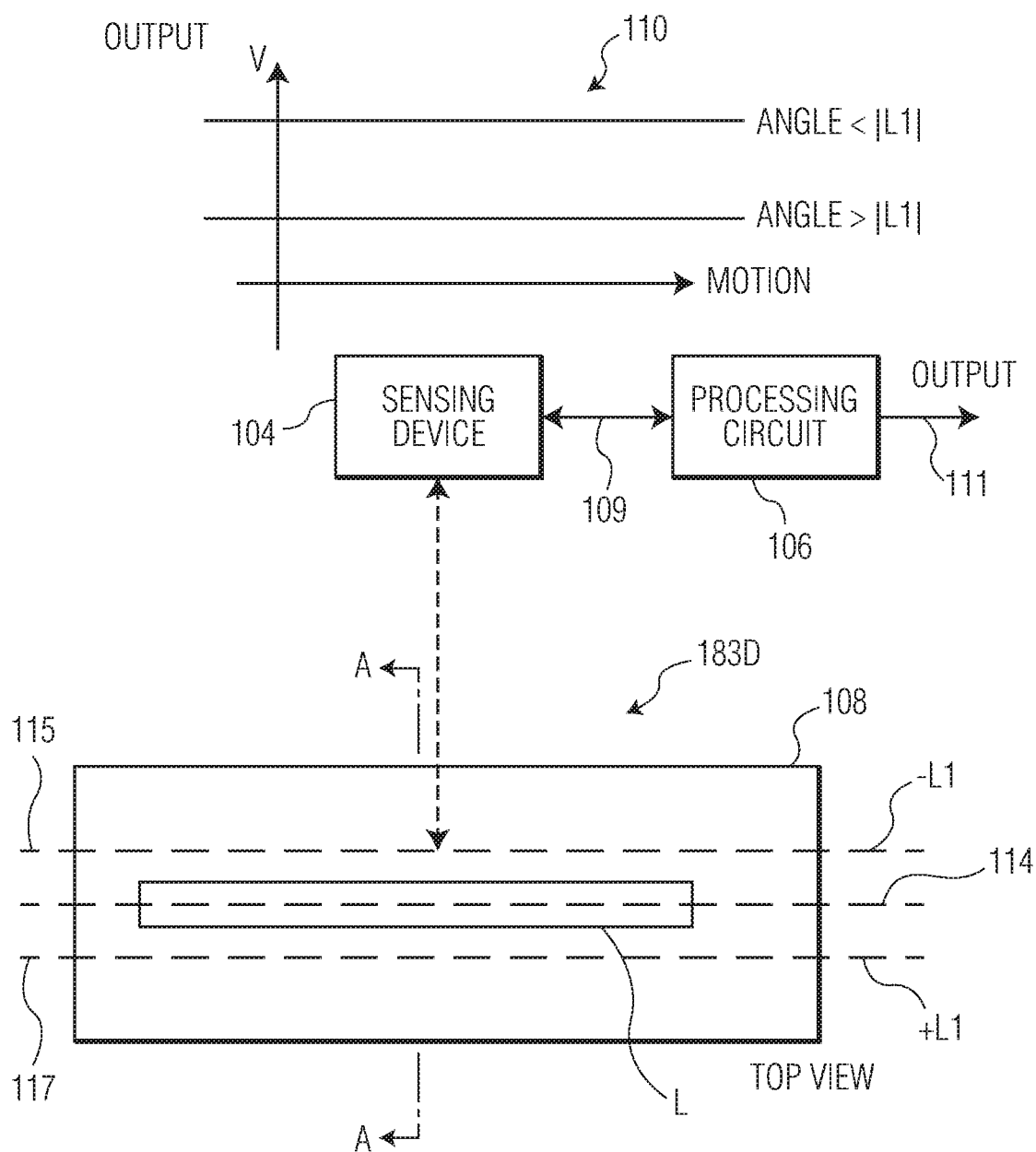
FIG. 1B depicts the position sensing system 100 of FIG. 1A, which shows the top view of the rotatable shaft 108 shown in FIG. 1A.
Figure 1C:
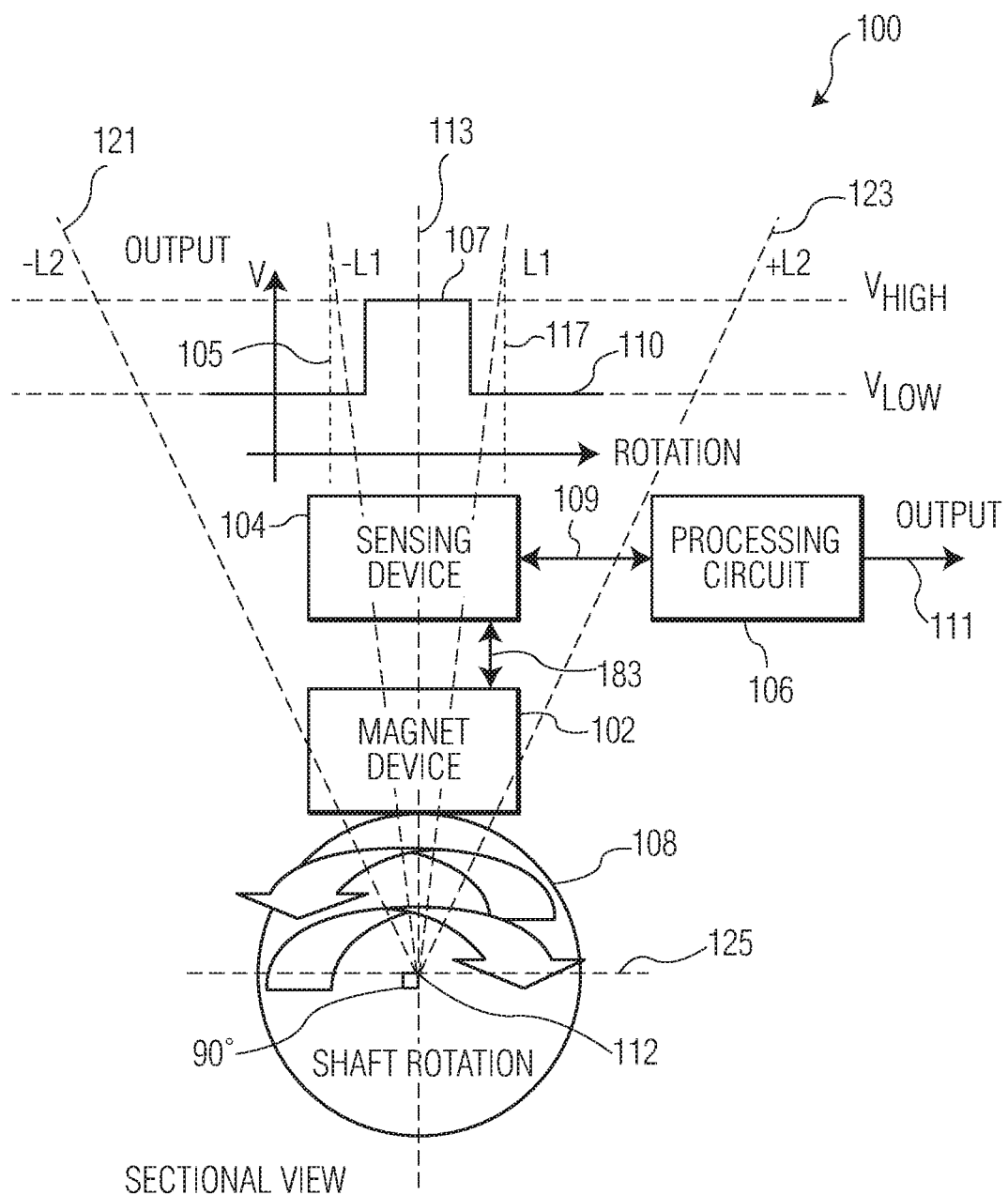
FIG. 1C depicts the position sensing system 100, which shows the sectional view of the rotatable shaft 108 shown in FIG. 1B along the line A-A in FIG. 1B.

FIG. 1B depicts the position sensing system 100 of FIG. 1, which shows the top view of the rotatable shaft 108. In the top view of the rotatable shaft 108, the sensing device 104 should be drawn in a position above the magnet device 102 (with the distance D 183). To better illustrate the principle of the present disclosure, however, the sensing device 104 is illustratively positioned at the lateral side of the rotatable shaft 108 in FIG. 2, but using a dot line 109 to reflect the above-below positional relationship between the magnet device 102 and the sensing device 104.

As shown in FIG. 1B, the magnet device 102 has a length L along the longitude direction of the rotatable shaft 108 to ensure that the sensing device 104 is always within the effective detecting region of the magnet device 102 when the rotatable shaft 108 linearly moves along its longitude direction. The dotted line 114 indicates a center line along the longitude direction of the rotatable shaft 108 and the dotted lines 115 and 117 define a rotation range (−L1, +L1) of the rotatable shaft 108. In other words, when the rotatable shaft 108 rotates left and right around its axis 112, the center line 114 rotate towards the dotted lines 115 and 117, respectively.

FIG. 1C depicts the position sensing system 100 of FIG. 1B, which shows the sectional view of the rotatable shaft 108 along the line A-A in FIG. 1B.

As shown in FIG. 1C, the rotatable shaft 108 can rotate from its center position (as indicated by the center line 113 in the diameter direction of the rotatable shaft 108) towards its left until it reaches its left rotation limitation −Lm (as indicated dotted line 121) or towards right until it reaches its right rotation limitation +Lm (as indicated by dotted line 123). The center line 113 passes and dissects the center line 114 and the axis 112 of the rotatable shaft 108. Hence, the two dotted lines 121 and 123 define a whole (or maximum) rotation range (−Lm, +Lm) for the rotatable shaft 108. Within the whole rotation range (−Lm, +Lm), the two dotted lines 115 and 117 define an internal rotation range (−L1, +L1) for the rotatable shaft 108. In the embodiment as shown in FIG. 1C, the whole rotation range and the internal rotation range are symmetrical in reference to the axis 112 and the center line 113 on the rotatable shaft 108. That is, the rotation ranges between −Lm and −L1 are equal to those between +Lm and +L1, respectively, in reference to the axis 112 and the center line 113. However, non-symmetrical arrangements of the rotation ranges are possible to a person skilled in the art. In addition, it is possible to expand the whole rotation range (−Lm, +Lm) of the rotatable shaft 108 to 360 degrees. To more clearly define the positional relationships among the components in FIGS. 1A-C, it should be noted that the center line 113 at the diameter direction of the rotatable shaft 108 is a straight line that passes through the axis 112 and is normal to the center line 114 along the longitude direction of the rotatable shaft 108.

Working together, the sensing device 104 and the processing circuit 106 can detect the angular position of the rotatable shaft 108 and generating a binary state indication signal 107 on the output 111. Specifically, the processing circuit 106 can generate a first signal state (a high voltage state Vhigh as shown in FIG. 1C or a low voltage state Vlow as shown in FIG. 9B) when the rotatable shaft 108 is within the rotation range (−L1, +L1); the processing circuit 106 generates a second signal state (a low voltage state Vlow as shown in FIG. 1C or a high voltage state Vhigh as shown in FIG. 9B) when the rotatable shaft 108 is outside (or beyond) the rotation range (−L1, +L1). The binary state indication signal 107 is then applied to an ECU (Engine Control Unit) 902 through the output terminal 111 of the processing circuit 106 (as shown FIG. 10).

Figure 2:
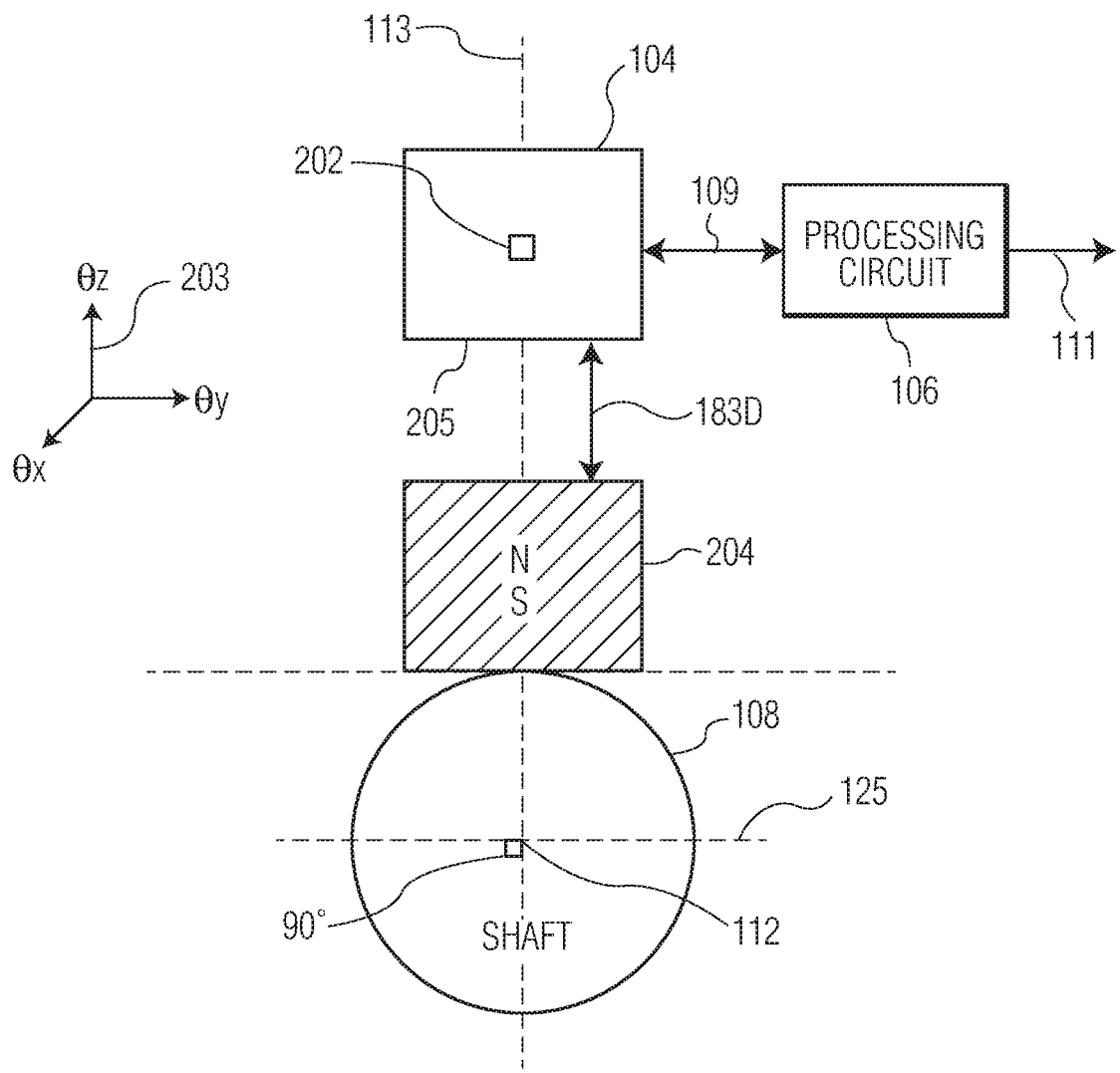
FIG. 2 depicts an exemplary implementation of the magnet device 102 and the sensing device 104 shown in FIGS. 1A-C.

FIG. 2 depicts an exemplary implementation of the magnet device 102 and the
sensing device 104 shown in FIGS. 1A-C.

As shown in FIG. 2, the magnet device 102 includes a magnet 204 having a south pole and a north pole. The south pole of the magnet 204 is attached on the surface of the rotation shaft 108. The front surface 205 of the sensing device 104 and the surface of the north pole of the magnet 204 are positioned facing with each other. The south pole and north pole of the magnet 204 are aligned with the axis 112 and the radial center line 113 on the rotatable shaft 108. The sensing device 104 is separated from the magnet 204 by a distance (or air gap) D 183 and coplanar with the magnet 204. As indicated in FIG. 1B, the magnet 204 has a length L and the longitude center line 114 along the longitude direction of the rotatable shaft 108. To more effectively detecting the magnetic flux density changes from the magnet 204, as one embodiment, the sensitive point of the sensing device 104 is aligned with the longitude center line 114 of the magnet 204.

As shown in FIG. 2, the sensing device 104 includes a sensing element 202, which can be a Hall-effect sensing device or magneto-resistive (MR) sensing device that is capable of generating an electrical signal when exposed to a rotating magnetic field. More specifically, a Hall-effect sensing element 202 can be a current-carrying semi-conductor membrane to generate a low voltage perpendicular to the direction of the current flow when subjected to magnetic flux density changes/magnetic field changes normal to the surface of the membrane. As shown in FIG. 2, the magnetic flux density changes/magnetic field changes within the air gape 183 along three dimensions 203 (Bx, By, Bz). The sensing device 104 is typically designed to detect the magnetic field changes along one of the Bx, or By, or both. The sensing element 202 can be configured on a detecting position that is sensitive and responsive to the magnetic flux density changes/magnetic field changes caused by the rotating magnet 204. In FIG. 2, B stands for magnetic flux density; Bx indicates the magnetic flux density measurement along the radial direction of the shaft 108 and perpendicular to the sensing element 202; and By indicates the magnetic flux density measurement that is tangential to the shaft 108 and coplanar to the sensing element 202.

FIGS. 3A-C depict three embodiments of the sensing system 100 shown in FIGS. 1A-C.

As shown in FIG. 3A, the sensing device 104A has a front side 305A and a back side 306A and the magnet device 102A includes a bipolar magnet 304A having a south pole and a north pole. The south pole of the magnet 304A is attached on the surface of the rotation shaft 108. The front surface 305A of the sensing device 104A and the surface of the north pole of the magnet 304A are positioned facing with each other. The south pole and north pole of the magnet 304A are aligned with the radial center line 113 on the rotatable shaft 108. The sensing device 104A includes a sensing element 302A and is separated from the magnet 304A by a distance (or air gap) D 183 and coplanar with the magnet 304A. The bipolar magnet 304A and the detecting position (where the sensing element 302A is located) are in a same plane perpendicular to the axial direction of the rotation of the bipolar magnet 304A. To concentrate/condense the magnetic flux density generated by the magnet 304A, a pair of magnet concentrators 308A1 and 308A2 are located at the two lateral sides of and adjacent to the bipolar magnet 304A, respectively.

As shown in FIG. 3B, the sensing device 104B has a front side 305B and a back side 306B and the magnet device 102B includes a bipolar magnet 304B having a south pole and a north pole. The south pole of the magnet 304B is attached on the surface of the rotation shaft 108. The front surface 305B of the sensing device 104B and the surface of the north pole of the magnet 304B are positioned facing with each other. The south pole and north pole of the magnet 304B are aligned with the center line 113 on the rotatable shaft 108. The sensing device 104B includes a sensing element 302B and is separated from the magnet 304B by a distance (or air gap) D 183 and coplanar with the magnet 304B. Similar to the structure shown in FIG. 3A, the bipolar magnet 304B and the detecting position (where the sensing element 302B is located) are in a same plane perpendicular to the axial direction of the rotation of the bipolar magnet 304B. To concentrate/condense the magnetic flux density generated by the magnet 304B, a magnetic flux density concentrator 309B is arranged at the back side of and adjacent to the sensing element 302B.

As shown in FIG. 3C, the sensing device 104C has a front side 305C and a back side 306C and the magnet device 102C includes a bipolar magnet 304C having a south pole and a north pole. The south pole of the magnet 304C is attached on the surface of the rotation shaft 108. The front surface 305C of the sensing device 104C and the surface of the north pole of the magnet 304C are positioned facing with each other. The south pole and north pole of the magnet 304C are aligned with the center line 113 on the rotatable shaft 108. The sensing device 104C includes a sensing element 302C and is separated from the magnet 304C by a distance (or air gap) D 183 and coplanar with the magnet 304C. Similar to the structure shown in FIG. 3A, the bipolar magnet 304C and the detecting position (where the sensing element 302C is located) are in a same plane perpendicular to the axial direction of the rotation of the bipolar magnet 304C. To concentrate/condense the magnetic flux density generated by the magnet 304C, a pair of magnet concentrators 308C1 and 308C2 that are located at the two lateral sides of and adjacent to the bipolar magnet 304C, respectively. To further concentrate/condense the magnetic flux density generated by the magnet 304C, a magnetic flux density concentrator 309C is arranged at the back side of and adjacent to the sensing element 302C.

In FIGS. 3B, 3C, 4B and 4C, the distance between the sensing element 302B (or 302C) and concentrator 309B (or 309C) must be such that the magnetic field topology generated by 304B (or 304C) can be adjusted. As one embodiment, the distance can be selected to be 0.1 mm, but several variables are possible. For example, according to the magnetic field topology generated by 304B (or 304C), the distance between the sensing element 302B (or 302C) and concentrator 309B (or 309C) can be selected from 0.1 mm to 5 mm.

In FIGS. 3A, 3C, 4A and 4C, the distance between the magnet 304A or 304C (or 404A or 404C) and concentrators 308A1 and 308A2 (or 308C1 and 308C2) must be such that the magnetic field topology generated by 304A and 304C (or 404A and 404C) can be adjusted. As one embodiment, the distance can be selected to be 0.1 mm, but several variables are possible. For example, according to the magnetic field topology generated by 304A and 304C (or 404A and 404C), the distance between the magnet 304A or 304C (or 404A or 404C) and concentrators 308A1 and 308A2 (or 308C1 and 308C2) can be selected to be 0.1 mm to 10 mm.

In FIGS. 3A-C and 4A-C, the distance (or air gap) D 183 is determined/selected based on the parameters of the magnets 304A-C and 404A-C, including the magnet size, magnet properties, radius of rotation and expected performance. In one embodiment of the present disclosure, the distance (or air gap) D 183 is selected to be 2 mm, but several variables are possible. For example, the distance (or air gap) D 183 can be selected to be 1 mm to 3 mm. The concentrator (308A1, 308A2, 308C1, 308C2, 309B and 309C) can be made from ferromagnetic materials or steels including metal alloys with large concentration of iron, non-exotic materials and non-precious metals.

As indicated in FIG. 1B, the magnets 304A-C shown in FIGS. 3A-C have a length L along the longitude direction of the rotatable shaft 108. To more effectively detecting the magnetic flux density changes from the magnet 304A-C, as one implementation, the sensitive point of the sensing elements 302A-C shown in FIG. 3-C are aligned with the center line 114 of the magnet 304A-C. The sensing element 302A, 302B, or 302 can be a Hall-effect sensing device or magneto-resistive (MR) sensing device.

FIGS. 4A-C depict three additional embodiments of the position sensing system 100 shown in FIGS. 1A-C.

In FIGS. 4A-C, the three additional embodiments have almost identical structures as those in FIGS. 3A-C, respectively, expect that the magnetic polarization orientation of the magnets 402A-C shown in FIGS. 4A-C is different from that of the magnets 302A-C shown in FIGS. 3A-C. As shown in FIGS. 4A-C, each of the north poles of the magnets 404A-C is attached on the surface of the rotation shaft 108. The front surfaces 305A-C of the sensing device 104A-C and the surfaces of the south poles of the magnet 404A-C are positioned facing with each other, respectively. The north poles and south poles of the magnet 404A-C are aligned with the center line 113 on the rotatable shaft 108.

Figure 5A:
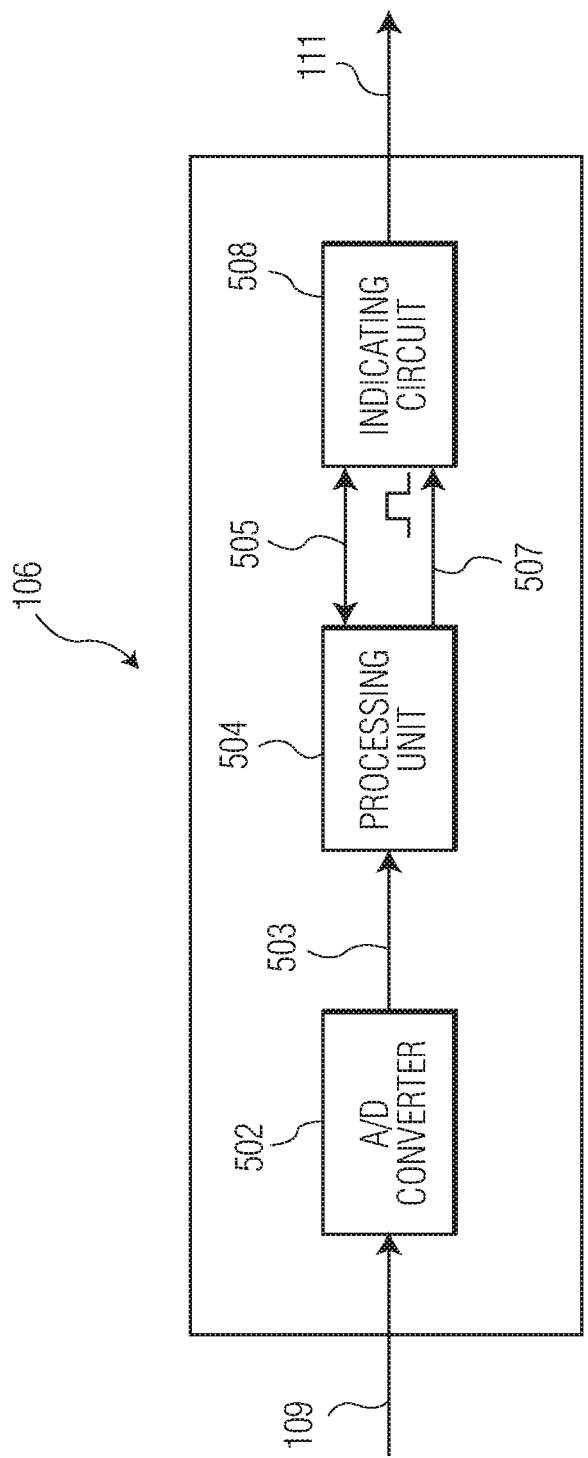
FIG. 5A depicts one embodiment of the processing circuit 106 in the position sensing system 100 in greater detail.

FIG. 5A depicts one embodiment of the processing circuit 1065 in the position sensing system 100 in greater detail. As shown in FIG. 5A, the processing circuit 106 includes an A/D convertor 502, a digital processing unit 504 and an indicating circuit 508, all of which are electronically connected together through links 503, 505 and 507. Being electrically connected to the sensing device 104 through the link 109, the A/D convertor 502 receives analog electronic signals as inputs from the sensing device 104 (or 104A-C), processes the analog electronic signals into digital electronic signals, and applies the digitized electronic signals to the processing unit 504 through the link 503. The processing unit 504 then processes the digitized electronic signals to determine whether the rotatable shaft 108 is within the rotation range (−L1, +L1). Based on its determination, the processing unit 504 sets the binary state output 111 of the indicating circuit 508 into a first signal state (a high voltage state Vhigh as shown in FIG. 1C or a low voltage state Vlow as shown in FIG. 9B) when the rotatable shaft 108 is within the rotation range (−L1, +L1); the processing unit 504 sets the binary state output 111 of the indicating circuit 508 into a second signal state (a low voltage state Vlow as shown in FIG. 1C or a high voltage state Vhigh as shown in FIG. 9B) when the rotatable shaft 108 is outside (or beyond) the rotation range (−L1, +L1).

More specifically, the binary state output 111 of the indicating circuit 508 can be set either in a high voltage state (Vhigh) or a low voltage state (Vlow) depending on the two control signals on the links 505 and 507, namely, the state control signal (having a first control signal state and a second control signal state) on the link 505 and the trigger signal (or a trigger pulse) on the link 507. When the digital processing unit 504 applies a trigger pulse onto the link 507 and a state control signal onto the link 505, the indicating circuit 508 is set into a voltage state that is the same to that of the state control signal as being applied on the link 505. When no trigger signal is applied onto the link 507, the indicating circuit 508 remains its current output state regardless the voltage state of the state control on the link 505. As an embodiment, the logic function of the indicating circuit 508 can be implemented by using a J-K register or a D register.

Therefore, when the processing unit 504 determines that the rotatable shaft 108 is within the rotation range (−L1, +L1), it applies a first control signal state (a high control state signal or a low control state signal) on the link 505 and a trigger signal on the link 507, which sets the indicating circuit 508 into the first signal state (a high voltage state Vhigh as shown in FIG. 1C or a low voltage state Vlow as shown in FIG. 9B). When the processing unit 504 determines that the rotatable shaft 108 is outside (or beyond) the rotation range (−L1, +L1), it applies a second control signal state (a low control state signal or a high control state signal) on the link 505 and a trigger signal on the link 507, which sets the indicating circuit 508 into the second signal state (a low voltage state Vlow as shown in FIG. 1C or a high voltage state Vhigh as shown in FIG. 9B).

Figure 5B:
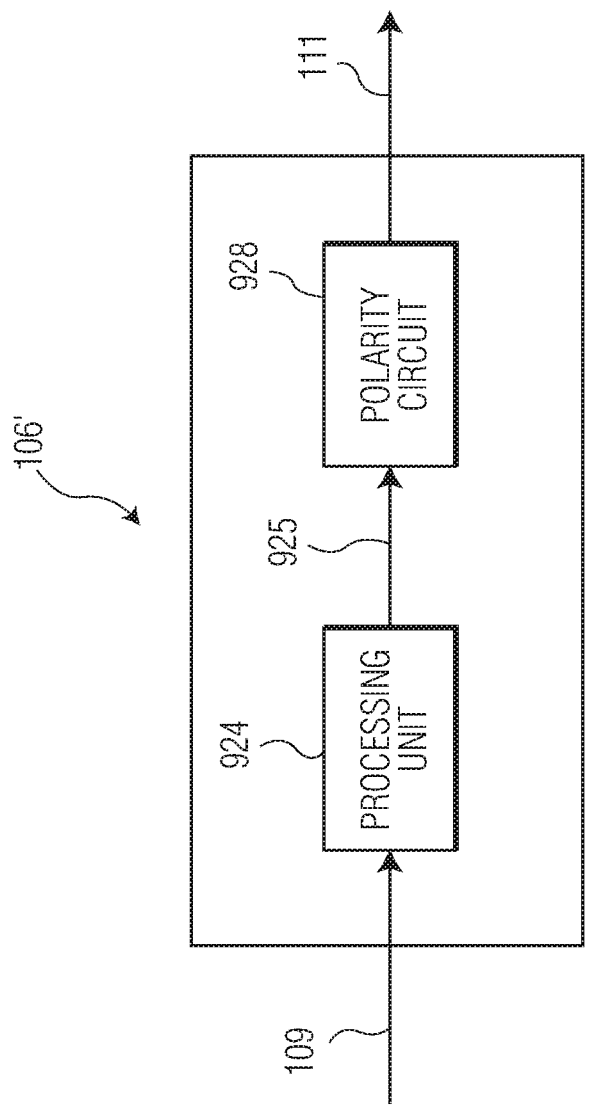
FIG. 5B depicts another embodiment of the processing circuit 106 in the position sensing system 100 in greater detail.

FIG. 5B depicts another embodiment of the processing circuit 1065 in the position sensing system 100 in greater detail. As shown in FIG. 5B, the processing circuit 106' includes an analog processing unit 924 and a polarity circuit 928. The analog processing unit 924 has an input that is coupled to the link 109 and an output that is coupled to the polarity circuit 928 through a link 925. The polarity circuit 928 has an output that is coupled to the output terminal 111.

The analog processing unit 924 receives electronic signals from the sensing device 104 (or 104A-C) and processes them to generate a first state driving signal when the rotatable shaft 108 is within the rotation range (−L1, +L1) and to generate a second state driving signal when the rotatable shaft 108 is outside (or beyond) the rotation range (−L1, +L1). In response to the first state driving signal, the polarity circuit 928 is set to a first state signal (a high voltage state Vhigh as shown in FIG. 1C or a low voltage state Vlow as shown in FIG. 9B); in response to the second state driving signal, the polarity circuit 928 is set a second state signal (a low voltage state Vlow as shown in FIG. 1C or a high voltage state Vhigh as shown in FIG. 9B).

Figure 8A:
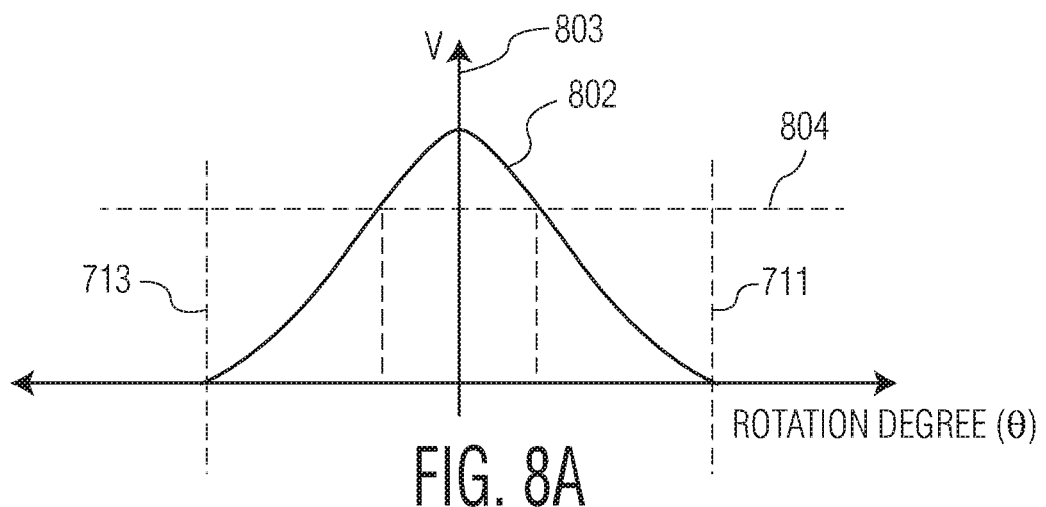
FIG. 8A depicts a bell-shaped function curve 802, which reflects the voltage outputs that are sensed by the sensing element 202 as shown in FIG. 2.
Figure 8B:
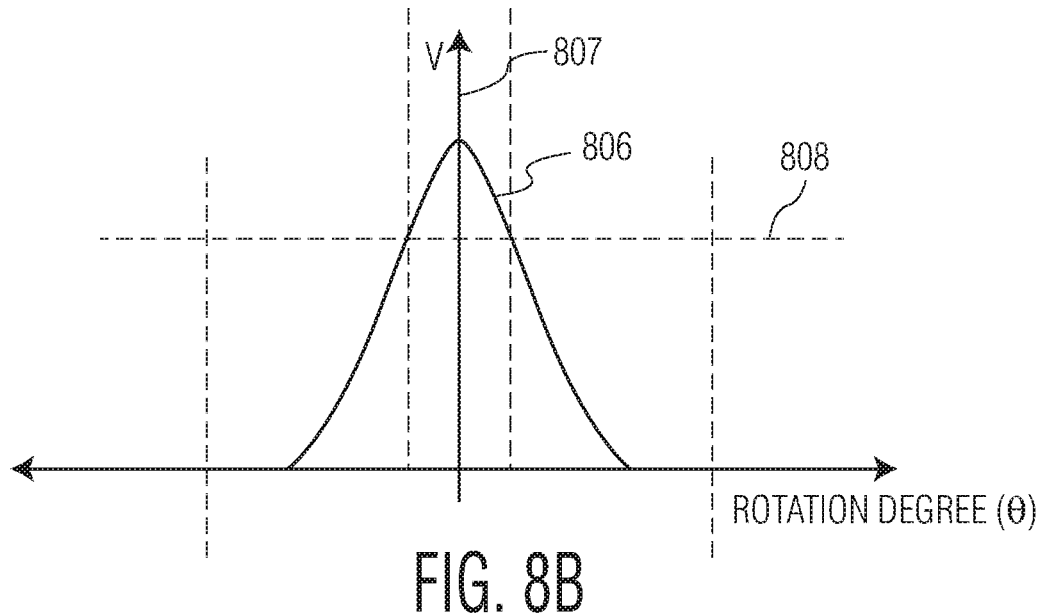
FIG. 8B depicts a bell-shaped function curve 806, which reflects the voltage outputs that are sensed by the sensing element (302A or 302B) shown in FIG. 3A, 3B, 4A or 4B.

More specifically, a threshold voltage is calibrated (or simulated) using the process in connection with the description for FIG. 8B. The calibrated (or simulated) threshold voltage is then set within the analog processing unit 924. When the sensed voltage from the sensing device 104 is greater or equal to the threshold voltage, the analog processing unit 924 generates a first state driving signal to set the polarity circuit 928 into a first state signal (a high voltage state Vhigh as shown in FIG. 1C or a low voltage state Vlow as shown in FIG. 9B). When the sensed voltage from the sensing device 104 (or 104A-C) is less than the threshold voltage, the analog processing unit 924 generates a second state driving signal to set the polarity circuit 928 into a second state signal (a low voltage state Vlow as shown in FIG. 1C or a high voltage state Vhigh as shown in FIG. 9B).

The analog processing unit 924 can be implemented using a low-pass filter or some similar devices.

Figure 6:
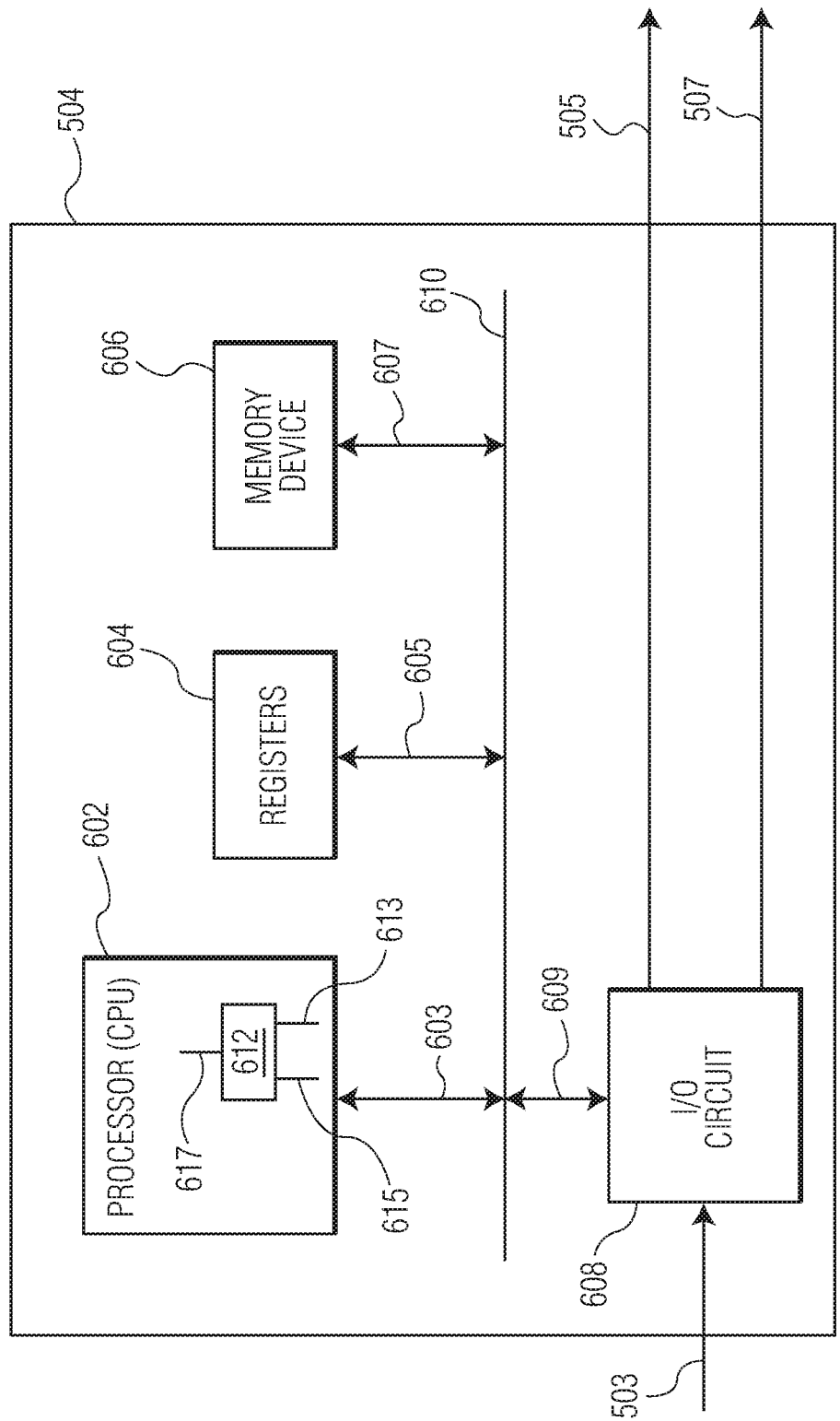
FIG. 6 depicts the processing unit 504 shown in FIG. 5A in greater detail.

FIG. 6 depicts the processing unit 504 shown in FIG. 5 in greater detail. As shown in FIG. 6, the processing unit 504 includes a processor (or CPU) 602, a register 604, a memory device 606, an I/O circuit 608 and a buss 610. The processor 602, register 604, memory device 606 and I/O circuit 608 are coupled to the buss 610 through links 603, 605, 607 and 609, respectively. The memory device 606 can store programs (i.e., a set of instructions), parameters (such as the reference voltages as shown in FIGS. 7B and 8B) and data (including the digitized electronic signals), the registers 604 can store the parameters and data, and the I/O circuit 608 can receive input signals into and send output signals out of the processing unit 504 (such as to the links 505 and 507). The registers 604 can provide and remain signals based on the contents stored therein for one or more CPU operation cycles so that the processor 602 can perform operations within the CPU operation cycles.

By executing the programs stored in the memory device 606, the processor (or CPU) 602 can control the operation of the registers 604, memory device 606 and I/O circuit 608 and can perform reading/writing operations on the registers 604 and memory device 606. The I/O circuit 608 can receive input signals from the A/D convertor 502 and send out the output signals from the processor (or CPU) 602 to the indicating circuit 508. To perform comparison logic operation, the processor (or CPU) 602 includes a logic operation unit (not shown) having a comparator 612, which can perform comparing operation from two sources of inputs 613 and 615 to generate a comparison result on output 617. The processor (or CPU) 602 can determine the subsequent operation based on the comparison result on output 617. More specifically, based on the comparison results, the processor (or CPU) 602 can generate a desirable state control signal and a trigger signal (or a trigger pulse) and send them to the links 505 and 507.

Figure 7A:
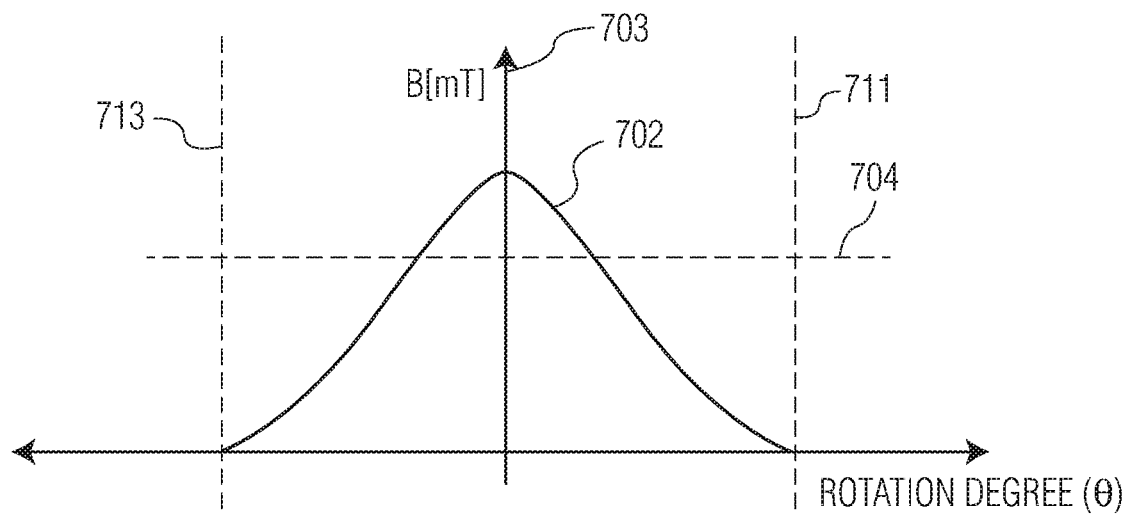
FIG. 7A depicts a bell-shaped function curve 702, which reflects the magnetic flux density changes/magnetic field changes that are caused by the magnet 204 shown in FIG. 2.
Figure 7B:
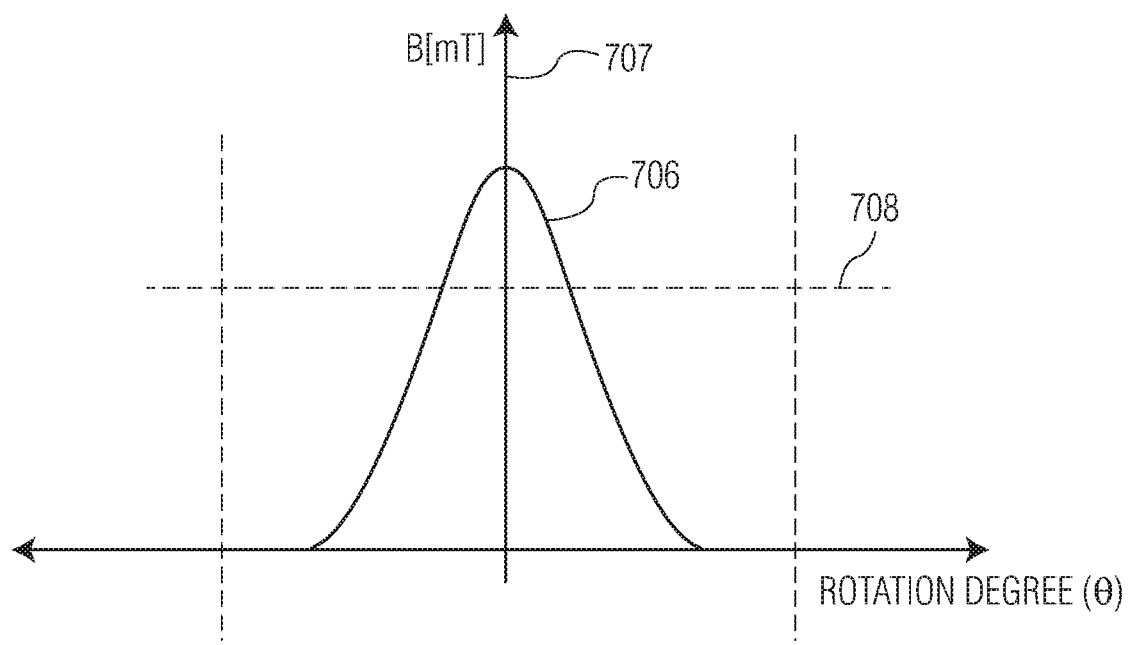
FIG. 7B depicts a bell-shaped function curve 706, which reflects the magnetic flux density changes/magnetic field changes that are caused by the magnet (304A, 304B, 404A or 404B) and magnetic flux density concentrator(s) (308A1, 308A2; 308C1, 308C2; 309B; or 309C) as shown in FIGS. 3A-B and 4A-B.

FIG. 7A depicts a bell-shaped function curve 702, which reflects the magnetic flux density changes/magnetic filed changes that are caused by the magnet 204 shown in FIG. 2 in reference to the detecting point of the sensing element 202 along one dimension (X dimension or Y dimension) while the magnet 204 is rotating around the rotatable shaft 108. As shown in FIG. 7A, the bell-shaped function curve 702 is symmetrical to the vertical center line 703, which corresponds to the radial central position of the rotatable shaft 108. As shown in FIG. 7A, the magnetic flux density on the bell-shaped function curve 702 is at a minimum value when the magnet 204 is at the most distant position (corresponding to line 713) to the sensing device 104 shown in FIG. 2. The magnetic flux density on the bell-shaped function curve 702 gradually increases to a maximum value when the magnet 204 is rotating towards the closest distance position (corresponding to line 703) to the sensing device 104. The magnetic flux density on the bell-shaped function curve 702 then decreases to the minimum value when the magnet 204 is rotating from the closest distance position towards the most distant position (corresponding to line 711) to the sensing device 104.

FIG. 7B depicts a bell-shaped function curve 706, which reflects the magnetic flux density changes that are caused by the magnet (304A, 304B, 404A or 404B) and magnetic flux density concentrator(s) (308A1, 308A2; 308C1, 308C2; 309B; or 309C) as shown in FIGS. 3A-B and 4A-B in reference to the detecting point of the sensing element (302A or 302B) along one dimension (X dimension or Y dimension) while the magnet (304A, 304B, 404A or 404B) is rotating around the rotatable shaft 108. As shown in FIG. 7B, bell-shaped function curve 706 is symmetrical to the vertical center line 707, which corresponds to the radial central position of the rotatable shaft 108. As shown in FIG. 7B, the magnetic flux density on the function curve 706 is at a minimum value when the magnet (304A, 304B, 404A or 404B) is at the most distant position (corresponding to line 713) to the sensing device 104A or 104B shown in FIGS. 3A-B and 4A-B. The magnetic flux density on the bell-shaped function curve 706 gradually increases to a maximum value when the magnet (304A, 304B, 404A or 404B) is rotating towards the closest distance position (corresponding to line 707) to the sensing device 104A or 104B. The magnetic flux density on the bell-shaped function curve 706 decreases to the minimum value when the magnet (304A, 304B, 404A or 404B) is rotating from the closest distance position towards the most distant position (corresponding to line 711) to the sensing device 104A or 104B.

In FIG. 7A, the line 704 indicates the magnetic flux density at the seventy percent (70%) value of the difference between the magnetic flux density maximum and the magnetic flux density minimum on the bell-shaped function curve line 702. In FIG. 7B, the line 708 indicates the magnetic flux density at seventy percent (70%) value of the difference between the magnetic flux density maximum and the magnetic flux density minimum on the bell-shaped function line 706.

It should be noted that the bell-shaped function curve 706 in FIG. 7B is steeper than the bell-shaped function curve 702 in FIG. 7A. To better compare the performance of the two bell-shaped function curves shown in FIGS. 7A-B, a density output ratio G1 based on the bell-shaped function curve 702 is defined as:

$$G1=H1/W1 \quad (1)$$

which is a ratio between H1 and W1 measured at a predetermined percentage (70% for example) of the magnetic flux density output on the bell-shaped function curve 702 where H1 stands for the magnetic flux density value at the predetermined percentage on bell-shaped function curve 702, and W1 stands for the rotation angle range which corresponds to the magnetic flux density value at the predetermined percentage on the bell-shaped function curve 702.

Likewise, a density output ratio G2 based on the bell-shaped function curve 706 is defined as:

$$G2=H2/W2 \quad (2)$$

which is a ratio between H2 and W2 measured at the predetermined percentage (70% for example) of the magnetic flux density output on the bell-shaped function curve 706 where H2 stands for the magnetic flux density at the predetermined percentage on the bell-shaped function curve 706, and W2 stands for the rotation angle range which corresponds to the magnetic flux density value at the predetermined percentage on the bell-shaped function curve 706.

Therefore, the density output ratio G2 on the bell-shaped function curve 706 is greater than the density output ratio G1 (G2>G1) on the bell-shaped function curve 702 because the function curve 706 is steeper than the function curve 702.

FIG. 8A depicts a bell-shaped function curve 802, which reflects the voltage outputs that are sensed by the sensing element 202 as shown in FIG. 2 in response to the magnetic flux density changes/magnetic field changes according to the bell-shaped function curve 702 shown in FIG. 7A.

FIG. 8B depicts a bell-shaped function curve 806, which reflects the voltage outputs that are sensed by the sensing element (302A or 302B) shown in FIG. 3A, 3B, 4A or 4B in response to the magnetic flux density changes/magnetic field changes according to the bell-shaped function curve 706 shown in FIG. 7B.

As voltage outputs, the bell-shaped function curve 802 (a voltage function curve) shown in FIG. 8A is proportional to the bell-shaped function curve 702 (a magnetic density function curve) shown in FIG. 7A. Likewise, the bell-shaped function curve 808 (a voltage function curve) shown in FIG. 8B is proportional to the bell-shaped function curve 708 (a magnetic density function curve) shown in FIG. 7B.

To better compare the performance of the two bell-shaped function curves shown in FIGS. 8A-B, a voltage output ratio G3 based on the function line 802 is defined as:

$$G3=H3/W3 \quad (3)$$

which is a ratio between H3 and W3 measured at a predetermined percentage (70% for example) of the voltage outputs on the bell-shaped function curve 802 where H3 stands for the voltage at the predetermined percentage on the bell-shaped function curve 802, and W3 stands for the rotation angle range which corresponds to the voltage value at the predetermined percentage on the bell-shaped function curve 802.

Likewise, the voltage output ratio G4 based on the bell-shaped function curve 806 is defined as:

$$G4=H4/W4 \quad (4)$$

which is a ratio between H4 and W4 measured at the predetermined percentage (70% for example) of the voltage output on the bell-shaped function curve 806 where H4 stands for the voltage at the predetermined percentage on the bell-shaped function curve 806, and W4 stands for the rotation angle range which corresponds to the voltage value at the predetermined percentage on bell-shaped function curve 806.

Therefore, the voltage output ratio G4 on the voltage function curve 806 is greater than the voltage output ratio G3 (G4>G3) on the voltage function curve 802 because the voltage function curve 806 is steeper than the voltage function curve 802.

In FIG. 8A, the line 804 indicates the voltage at the seventy percent (70%) value of the difference between the voltage maximum and the voltage minimum on the function curve 802. In FIG. 8B, the line 808 indicates the voltage at seventy percent (70%) value of the difference between the voltage maximum and the voltage minimum on the function curve line 806.

According to one embodiment, the voltage output curve 806 and the threshold line 808 can be generated in a calibration (or simulation) process. Specifically, when the magnet device 304A (or 304B) is constantly rotating around the axis 112 of the rotatable shaft 108, the sensing device 104A (or 104B) generates electrical signals that comply with the function curve 806 in response to the magnetic flux density changes/magnetic field changes generated by the magnet device 102A (or 102B) along one dimension (X dimension or Y dimension).

In performing the calibration (or simulation) process, a processing device (such as the processing circuit 106) processes the analog electronic signals that comply with the function curve 806 (shown in FIG. 8B) to generate a threshold voltage as indicated by line 808. Specifically, within the processing circuit 106, the A/D convertor 502 receives analog electronic signals (that comply with function curve 806) from the sensing device 104A (or 104B), converts them into digital electronic signals, and applies the digitized electronic signals to the I/O circuit 608 in the processing unit 504. After receiving the digitized electronic signals, the processor (CUP) 602 in the processing unit 504 stores them into the memory device 606 and then transform the digitized electronic signals into the threshold voltage 808 using the mathematical formula (5) as follows:

$$\text{Threshold voltage 808} = (\text{Voltage Max} - \text{Voltage Min}) \times (\text{Predetermined Percentage Value}) \quad (5)$$

In the present disclosure, the Predetermined Percentage Value is selected as 70%, but other Percentage Value is possible.

Figure 8C:
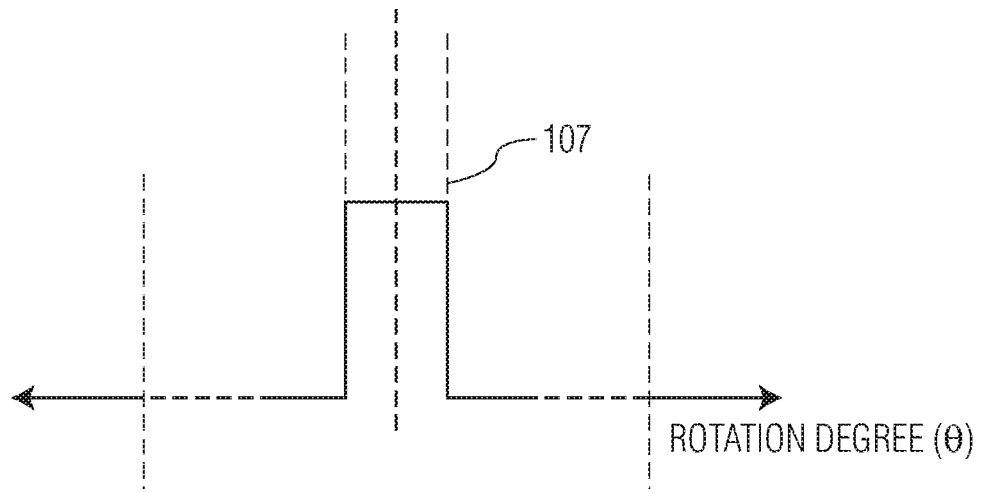
FIG. 8C depicts a scheme to form a binary state signal 107 having a first signal state and a second signal state based on the bell-shaped function curve 806 in the calibration (or simulation) process.

FIG. 8C depicts a scheme to form a binary state signal 107 having a first signal state (a high voltage Vhigh) and a second signal state (a low voltage Vlow) based on the bell-shaped function curve 806 in the calibration (or simulation) process. Based on the mathematic formula (5), the digital processing circuit 106 shown in FIG. 5A (or the analog processing circuit 106' shown in FIG. 5B) generates the binary state signal 107 by matching all voltage points (or voltages) on the bell-shaped function curve 806 that are equal to or greater than the threshold voltage 808 as a first binary state signal (a high voltage Vhigh); and by matching all voltage points (or voltages) on the bell-shaped function curve 806 that are less than the threshold voltage 808 as a second binary state signal (a low voltage Vlow). The electronic signals as shown in FIG. 8B can be observed from an oscilloscope when the calibration (or simulation) outputs are applied to the oscilloscope.

In FIG. 8B, to cope with the variations in the operating condition of the position detecting system 100 (including the variations in air gaps and temperature and the parameters variations in components), the width of the binary state signal 107 can be compensated by adjusting the value of the threshold voltage 808. According to one embodiment, the threshold voltage 808 generated in the calibration (or simulation) process is stored into the memory device 506 so that the processing circuit 504 can later use it to detect the rotation range of the rotatable shaft 108 in field use. According to another embodiment, the threshold voltage 808 generated in the calibration (or simulation) process is set into the analog processing unit 924 so that the analog processing unit 924 can use it to detect the rotation range of the rotatable shaft 108 in field use.

It should be noted that the electronic-contactless sensing devices inevitably encounter operating condition variations in manufacturing and/or in operation, including, but not limited to, the variations in air gaps, temperature and the parameter variations in the components used. The adjustment/compensation capability is critical for measurement accuracy, especially for detecting the neutral position range for a gear shaft on automobile vehicles. The basis for the adjustment/compensation (including width and/or offset) is the usage of a binary state signal to indicate an angular position range. To facilitate maintenance of the position sensing system 100, the calibration (or simulation) process can be performed in field use by executing the calibration (or simulation) programs that are stored in the processing circuit 106. As one embodiment, the width of the binary state signal can adjusted by monitoring and updating the minimum and maximum peaks of the electronic signals that comply with the bell-shaped function curve (806). Such an approach is a feasible and effective way to adjust the binary state signal.

Figure 9A:
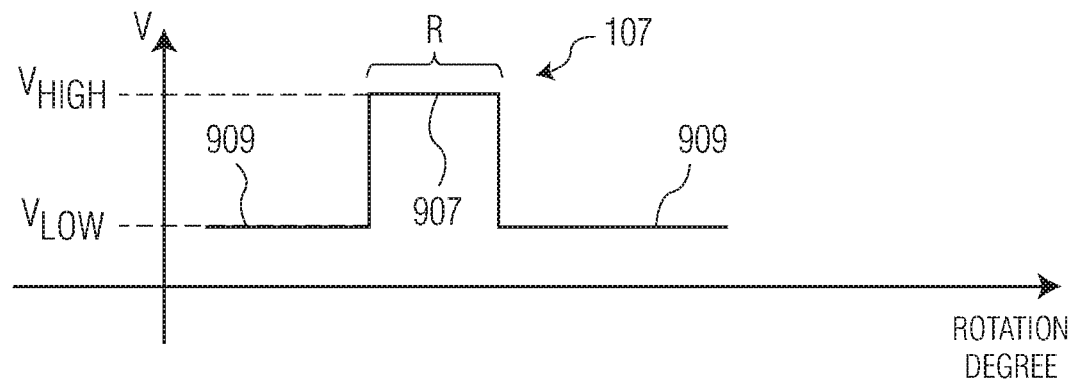
FIGS. 9A-B illustrates using either a positive binary state signal 107 or a negative binary state signal 1075 to indicate the rotation range for the rotatable shaft 108 shown in FIGS. 1A-C.
Figure 9B:
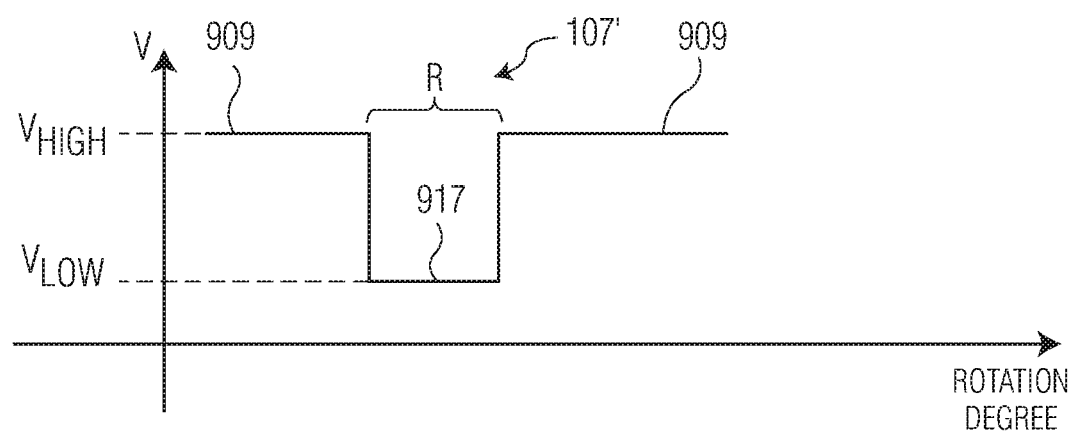

FIGS. 9A-B illustrates that either a positive binary state signal 107 or a negative binary state signal 107' can be used to indicate the rotation range (−L1, +L1) for the rotatable shaft 108.

Specifically, as shown in FIG. 9A, when the rotatable shaft 108 is within the rotation range (−L1, +L1), the digital processing circuit 106 shown in FIG. 5A sets the indicating circuit 508 in a high voltage state Vhigh as indicated by line 907; when the rotatable shaft 108 is beyond (or outside of) the rotation range (−L1, +L1), the processing unit 504 in the digital processing circuit 106 sets the indicating circuit 508 in a low voltage state Vlow as indicated by line 909.

Alternatively, as shown in FIG. 9B, the binary state signal 107' can be a reverse of the binary state signal 107. Therefore, in FIG. 9B, when the rotatable shaft 108 is within the rotation range (−L1, +L1), the processing circuit 106 shown in FIG. 5A sets the indicating circuit 508 in a low voltage state Vlow as indicated by line 917; when the rotatable shaft 108 is beyond (or outside of) the rotation range (−L1, +L1), the processing unit 504 sets the indicating circuit 508 in a high voltage state Vhigh as indicated by line 919.

Figure 10:
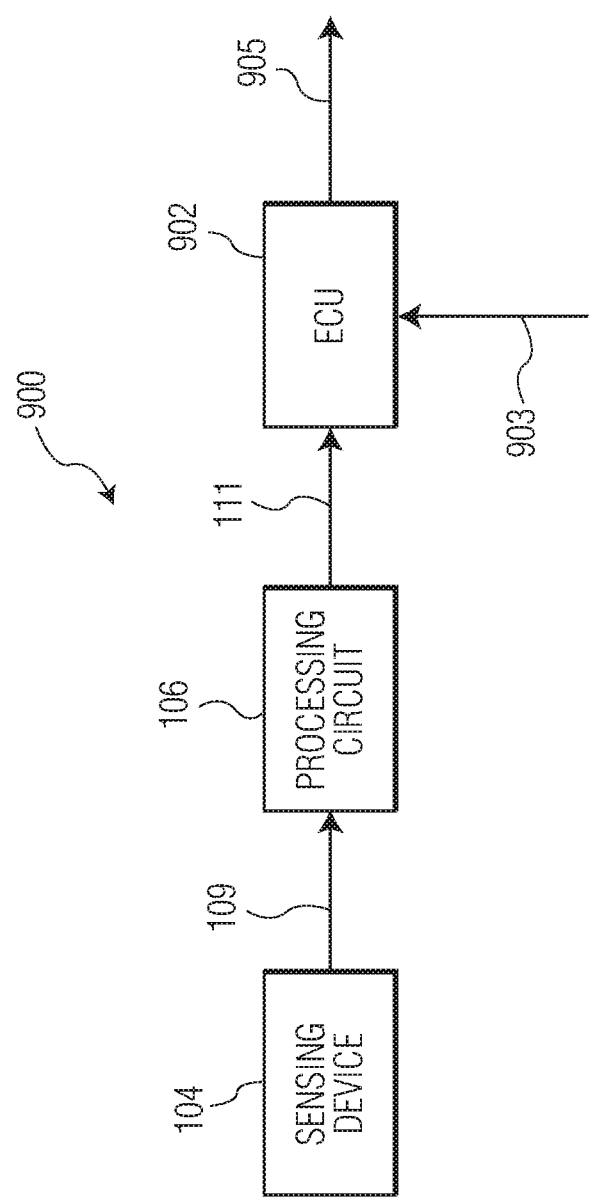
FIG. 10 depicts an engine control system 900, in which the output 111 of the processing circuit 106 shown in FIGS. 1A-C is used to control the engine in an automobile vehicle.

FIG. 10 depicts an engine control system 900 in which the binary output 111 of the processing circuit 106 (or processing circuit 106') is used to control the engine in an automobile vehicle. In FIG. 10, the engine control system 900 includes the sensing device 104, the processing circuit 106 and an ECU (Engine Control Unit) 902. In the engine control system 900, the rotatable shaft 108 is used as a gear shift lever and the rotation range (−L1, +L1) reflects the neutral position range of the gear shift lever.

As shown in FIG. 10, the ECU (Engine Control Unit) 902 receives the binary state signal on link 111 as its input from the processing circuit 106 and receives the input 903 from clutch sensing circuitry (not shown) of the automobile vehicle. The input 903 indicates whether the clutch of the automobile vehicle is being pressed. When the ECU 902 detects that the gear shift lever stays within the neutral position range based on the binary state signal on link 111 for a certain period of time (5 seconds for example), it shuts down the engine of the automobile vehicle to save gas. When the ECU 902 detects that the clutch of the automobile vehicle is being pressed based on the inputs on the link 903, the ECU 902 further detects whether the gear shift lever is within the neutral position range based on the binary state signal on link 111. The ECU 902 starts the engine only when the gear shift lever is within the neutral position range. Therefore, the detection accuracy of the neutral position range for the gear shift lever is important to ensure the appropriate operation of the automobile vehicle.

It should be noted that the bell-shaped function line 806 can generate a binary state signal that is narrower in reference to the rotation angle arrange of the rotatable shaft 108 than the bell-shaped line 802 does. It should be appreciated that a narrower binary state signal 107 is especially desirable especially when the position sensing system 100 is used to detect the neutral position range for the gear shift lever in an automobile vehicle.

In field use, the digital processing circuit 106 as shown in FIG. 5A or the analog processing circuit 106' as shown in FIG. 5B sets the indicating circuit 508 into the first signal state and the second signal state in response to the rotation angle of the rotatable shaft 108 using the steps as follows:

In field use, according to one embodiment, when the rotatable shaft 108 is being rotated with a rotation angle, the sensing device 104A (or 104B) generates an electrical signal in response to the magnetic flux density changes and/or magnetic field changes caused by the magnet device 102A or 102B along X dimension and/or Y dimension. The sensed voltages comply with the bell-shaped curve 808 shown in FIG. 8B. The sensing device 104A (or 104B) sends the electrical signals to the processor (CPU) 602 in the processing circuit 106.

The processor (CPU) 602 compares the sensed voltage with the threshold voltage 808. If the value of the sensed voltage is equal to or is greater than the threshold voltage 808, the processor (CPU) 602 generates corresponding state control signal and trigger signal on the links 505 and 507, respectively, to set the indicating circuit 508 into a first signal state (a high voltage state Vhigh as shown in FIG. 1C or a low voltage state Vlow as shown in FIG. 9B). If the value of the sensed voltage is less than the threshold voltage 808, the processor (CPU) 602 generates the corresponding state control signal and trigger signal on the links 505 and 507, respectively, to set the indicating circuit 508 into a second signal state (a low voltage state Vlow as shown in FIG. 1C or a high voltage state Vhigh as shown in FIG. 9B).

The programs (or instruction sets) to perform the specific steps for setting the indicating circuit 508 can be stored in the memory device 606 and executed by the processor (CPU) 602.

In field use, according to another embodiment, when the rotatable shaft 108 is being rotated with a rotation angle, the sensing device 104A (or 104B) generates an electronic signal in response to the magnetic flux density changes and/or magnetic field changes caused by the magnet device 102A or 102B along one dimension (X dimension and/or Y dimension). The sensed electronic signal complies with the bell-shaped function curve 808 shown in FIG. 8B.

When the sensed voltage of the electric signal from the sensing device 104A (or 104B) is greater or equal to the threshold voltage, the analog processing unit 924 generates a first state driving signal to set the polarity circuit 928 into a first state signal (a high voltage state Vhigh as shown in FIG. 1C or a low voltage state Vlow as shown in FIG. 9B). When the sensed voltage of the electric signal from the sensing device 104A (or 104B) is less than the threshold voltage, the analog processing unit 924 generates a second state driving signal to set the polarity circuit 928 into a second state signal (a low voltage state Vlow as shown in FIG. 1C or a high voltage state Vhigh as shown in FIG. 9B).

To reduce the costs for an ECU system, it is desirable to simplify the architecture of its control unit. One item of doing so is to change the sensor input from an A/D converter input to a logic binary input at this control unit. This can be realized on sensor side with a mechanical switch with disadvantages of low measurement accuracy and poor reliability.

It should be noted that the position sensing system shown in FIG. 3C or 4C can generate a bell-shaped function curve that is even steeper than those generated by the sensing system shown in FIGS. 3A-B and 4A-B because the position sensing system shown in FIG. 3C or 4C have two sets of magnetic density concentrators 308C1, 308C2 and 309C. However, the implementation principle of generating a binary state signal for the position sensing system shown in FIG. 3C or 4C are the same with that in connection with the position sensing systems shown in FIGS. 3A-B and 4A-B. Therefore, the position sensing system shown in FIG. 3C or 4C can generate a binary state signal that is narrower than that in the sensing system shown in FIGS. 3A-B and 4A-B.

It is apparent to those skilled in the art that various modifications and variations can be made to the embodiments described herein without departing from the spirit and scope of the present disclosure. Thus, it is intended that the specification cover the modifications and variations of the various embodiments described herein, provided such modification and variations come within the scope of the appended claims and their equivalents.

What is claimed is:

1. A magnet device for providing the magnetic density changes/magnetic field changes in relation to a detecting position, the magnet device comprising:
    a magnet member mounted on a rotatable shaft and rotated therewith, the magnet member producing the magnetic density changes/magnetic field changes in relation to the detecting position when the magnet member is rotating around the rotatable shaft, the magnet member having a south pole, a north pole, and a pole direction extending from the south pole to the north pole, the magnet member has a first lateral side and a second lateral side that are located at opposite sides of the magnet member, the south pole or the north pole is attached on the rotatable shaft; and
    a first magnetic flux density concentrator element mounted on the rotatable shaft with the magnet member and rotating on the rotatable shaft in unison with the magnet member such that a rotation of the first magnetic flux density concentrator is equal to a rotation of the magnet member to concentrate/condense the density of the magnetic density changes/magnetic field changes, the first magnetic flux density concentrator element is positioned adjacent to the first lateral side of the magnet member and a second magnetic flux density concentrator element is positioned adjacent to the second lateral side of the magnet member, the first and second magnetic flux density concentrator elements increase the output ratio of the magnetic density changes/magnetic field changes of the magnet member; wherein
    the magnet device is used with a sensing device having a sensing element with a front side and a back side, the first magnetic flux density concentrator element being positioned adjacent to the front side of the sensing element and concentrating/condensing the density of the magnetic density changes/magnetic field changes in the pole direction of the magnet member toward the sensing element, the sensing device has the detecting position where the sensing element is located, the front side of the sensing device faces the north pole or south pole of the magnet member when the magnet member is positioned due facing to the front side of the sensing device during the rotation of the magnet member, the sensing device is separated from the magnet member by a distance.

2. The magnet device of claim 1, wherein:
each of the magnetic flux density concentrator elements is made from ferromagnetic materials.

3. The magnet device of claim 1, wherein:
the magnet member is mounted so that the north and south poles of the magnet member are arranged along the radial direction of the rotatable shaft.

4. The magnet device of claim 3, wherein:
the magnet member and the detecting position are in a same plane perpendicular to the axial direction of the rotation of the magnet member.

5. The magnet device of claim 4, wherein:
the magnet member rotates together the first and second magnetic flux density concentrator elements around the rotatable shaft.

6. The magnet device of claim 5, wherein:
the lateral center lines of the first and second magnetic flux density concentrator elements are aligned with the lateral center line of the magnet member.

7. The magnet device of claim 3, wherein:
the sensing device includes a third sensing magnetic flux density concentrator element positioned adjacent to the back side of the sensing element, and the center line of the sensing magnetic flux density concentrator element and the detecting position are aligned with the center line that passes through the south and north poles of the magnet member.

8. A position sensing system for generating binary state signals to indicate the angular position range for a rotatable shaft, the sensor device system comprising:
    a magnet device in any one of claims 1 and 2-7, which generates the magnetic density changes/magnet field changes;
    a sensing device for generating electronic signals in response to the magnetic density changes/magnetic field changes; and
    a processing circuit for generating the binary state signals in response to the electronic signals, the processing circuit comprising a threshold circuit for providing a threshold voltage on a bell-shaped function curve and an indicating circuit generating a first signal state when a voltage of the sensed electrical signals is above (or below) the threshold voltage and a second signal state when the voltage of the sensed electrical signals is below (or above) the threshold voltage.

9. The position sensing system of claim 8, wherein:
the sensing device has a front side and a back side, the front side of the sensing device faces the north pole or south pole of the magnet member when the magnet member is positioned due facing to the front side of the sensor circuit during the rotation of the magnet member,
the sensing device is disposed separately from the magnet member.

10. The position sensing system of claim 9, wherein:
the sensing device is used to sense an angular position range of the rotatable shaft.

11. The position sensing system of claim 10, wherein:
the angular position range is a neutral position range on a gear shift lever.

12. The position sensing system device of claim 11, wherein:
the sensing device includes a Hall effect sensor.

13. The position sensing system of claim 8, wherein:
the threshold voltage and the bell-shaped function curve are calibrated prior to installation of the position sensing system in response to the magnetic flux density changes/magnetic field changes in one dimension when the magnet member rotates around the rotatable shaft for 360 degrees.

14. The position sensing system of claim 13, wherein:
the binary state signal switches between the first signal state and the second signal state in response to angular position changes of the rotatable shaft.

15. The position sensing system of claim 14, further comprising:
an adjusting circuit for adjusting the binary state signal to compensate variations of operating condition including variations in air gaps and temperature and parameter variations in components used, by monitoring and updating the min and max peaks of the electronic signals.

16. The position sensing system of claim 15, wherein:
the binary state signal is adjusted by monitoring and updating the minimum and maximum peaks of the electronic signals.

17. The position sensing system of claim 15, wherein:
the width of the binary state signal is adjusted by monitoring and updating the minimum and maximum peaks of the electronic signals.

18. A magnet device for providing the magnetic density changes/magnetic field changes in relation to a detecting position, the magnet device comprising:
a magnet member mounted on a rotatable shaft and rotated therewith, the magnet member producing the magnetic density changes/magnetic field changes in relation to the detecting position when the magnet member is rotating around the rotatable shaft, the magnet member having a south pole, a north pole, and a pole direction extending from the south pole to the north pole, the magnet member has a first lateral side and a second lateral side that are located at opposite sides of the magnet member; and
a first magnetic flux density concentrator element mounted on the rotatable shaft with the magnet member and rotating on the rotatable shaft in unison with the magnet member such that a rotation of the first magnetic flux density concentrator is equal to a rotation of the magnet member to concentrate/condense the density of the magnetic density changes/magnetic field changes, the first magnetic flux density concentrator element is positioned adjacent to the first lateral side of the magnet member and a second magnetic flux density concentrator element is positioned adjacent to the second lateral side of the magnet member; wherein
the magnet device is used with a sensing device having a sensing element with a front side and a back side, the first magnetic flux density concentrator element being positioned adjacent to the front side of the sensing element and concentrating/condensing the density of the magnetic density changes/magnetic field changes in the pole direction of the magnet member toward the sensing element, the sensing device includes a third sensing magnetic flux density concentrator element positioned adjacent to the back side of the sensing element, and the center line of the sensing magnetic flux density concentrator element and the detecting position are aligned with the center line that passes through the south and north poles of the magnet member.

* * * * *